United States Patent [19]

Haskins

[11] Patent Number: 5,076,390

[45] Date of Patent: Dec. 31, 1991

[54] MULTIPLE MODE WHEELCHAIR CONSTRUCTION

[76] Inventor: John T. Haskins, 18721 Mantle Dr., Roland, Ark. 72135

[21] Appl. No.: 547,199

[22] Filed: Jul. 3, 1990

[51] Int. Cl.[5] .......... B62M 1/14

[52] U.S. Cl. .......... 280/250.1; 280/304.1; 297/DIG. 4

[58] Field of Search .......... 280/250.1, 304.1, 298, 280/47.25, 650; 180/907; 297/DIG. 4

[56] References Cited

U.S. PATENT DOCUMENTS

| | | | |
|---|---|---|---|
| 948,349 | 2/1910 | Settle | 280/298 |
| 3,953,054 | 4/1976 | Udden et al. | 280/250.1 |
| 4,098,521 | 7/1978 | Ferguson et al. | 280/250.1 |
| 4,477,117 | 10/1984 | Higgs | 280/250.1 |
| 4,537,829 | 7/1985 | Fanslau et al. | 297/DIG. 4 |
| 4,582,448 | 4/1986 | Costello et al. | 280/250.1 |
| 4,595,212 | 6/1986 | Haury | 297/DIG. 4 |
| 4,840,390 | 6/1989 | Lockard et al. | 297/DIG. 4 |

FOREIGN PATENT DOCUMENTS

| | | | |
|---|---|---|---|
| 2517418 | 4/1975 | Fed. Rep. of Germany | 297/DIG. 4 |
| 2703727 | 8/1978 | Fed. Rep. of Germany | 180/907 |
| 7901599 | 9/1980 | Netherlands | 297/DIG. 4 |
| 1517311 | 7/1978 | United Kingdom | 180/907 |
| 2048791 | 12/1980 | United Kingdom | 280/250.1 |

*Primary Examiner*—Mitchell J. Hill
*Assistant Examiner*—Anne Marie Boehler
*Attorney, Agent, or Firm*—Stephen D. Carver

[57] ABSTRACT

Multiple mode wheelchairs designed to temporarily ergonomically assume operative configurations of reduced width and/or increased elevation, include collapsible frames, removable wheels and adjustable height, reversible seats. Rigid, spaced apart frame sides are interconnected by user configurable linkages. Preferably the frame comprises a synchronized parallelogram linkage system for foldability. Quick-release axle assemblies mount the large drive wheels for facilitating tool-free wheel removal. A pair of selectively deployable auxiliary wheels permit maneuvering through narrow aircraft aisles when the large drive wheels are removed. The caster wheels also may be removed for storage and shipping. The seat comprises a removable back, removable armrests, and a removable footrest, and is mounted upon pressurized, pneumatic cylinders which telescopingly facilitate user height adjustments. Preferably the cylinders are coaxially associated with a sleeve system linked with the frame. The cylinder assembly forms a removable power pack for quick interchangeability. Preferably the seat is mounted by jaw clamps which permit the user to quickly attach or remove the seat without special tools. The clamps also facilitate reversal of the seat position where desired by the user to reorient the relative position of the large drive wheels. A convenient lever associated with the seat enables the user to activate the pneumatic elevation control cylinders. Other embodiments comprise a rigid, knock-down frame which can be disassembled and packed into a carrying case, and an outboard auxiliary wheel system.

55 Claims, 9 Drawing Sheets

FIG. 10
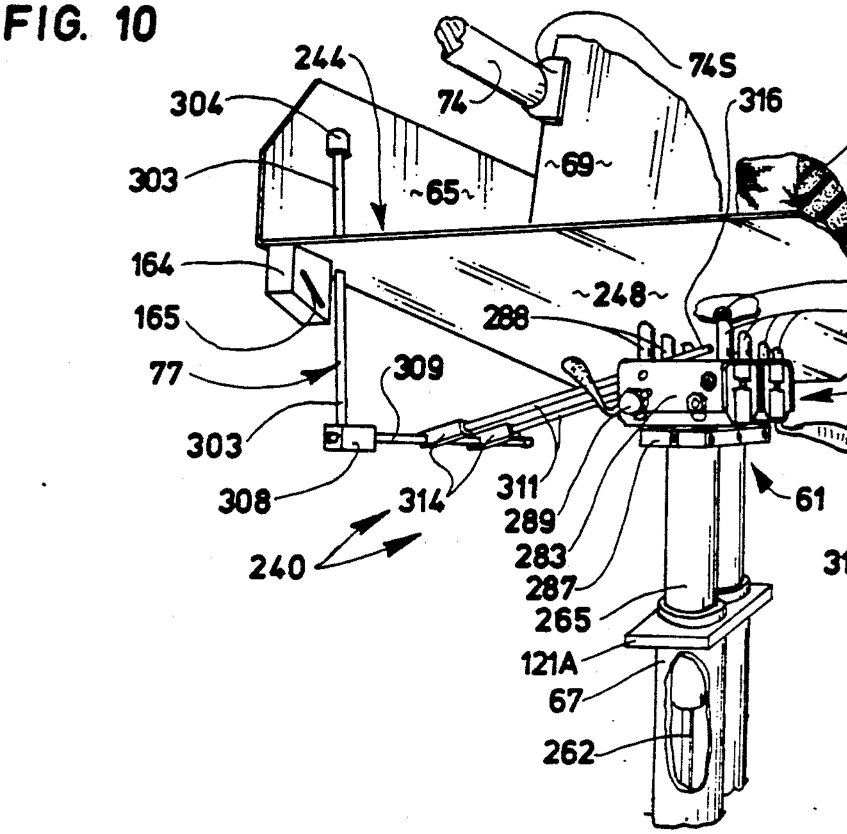
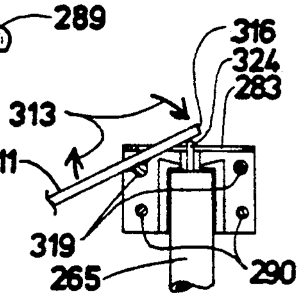
FIG. 11A
FIG. 11
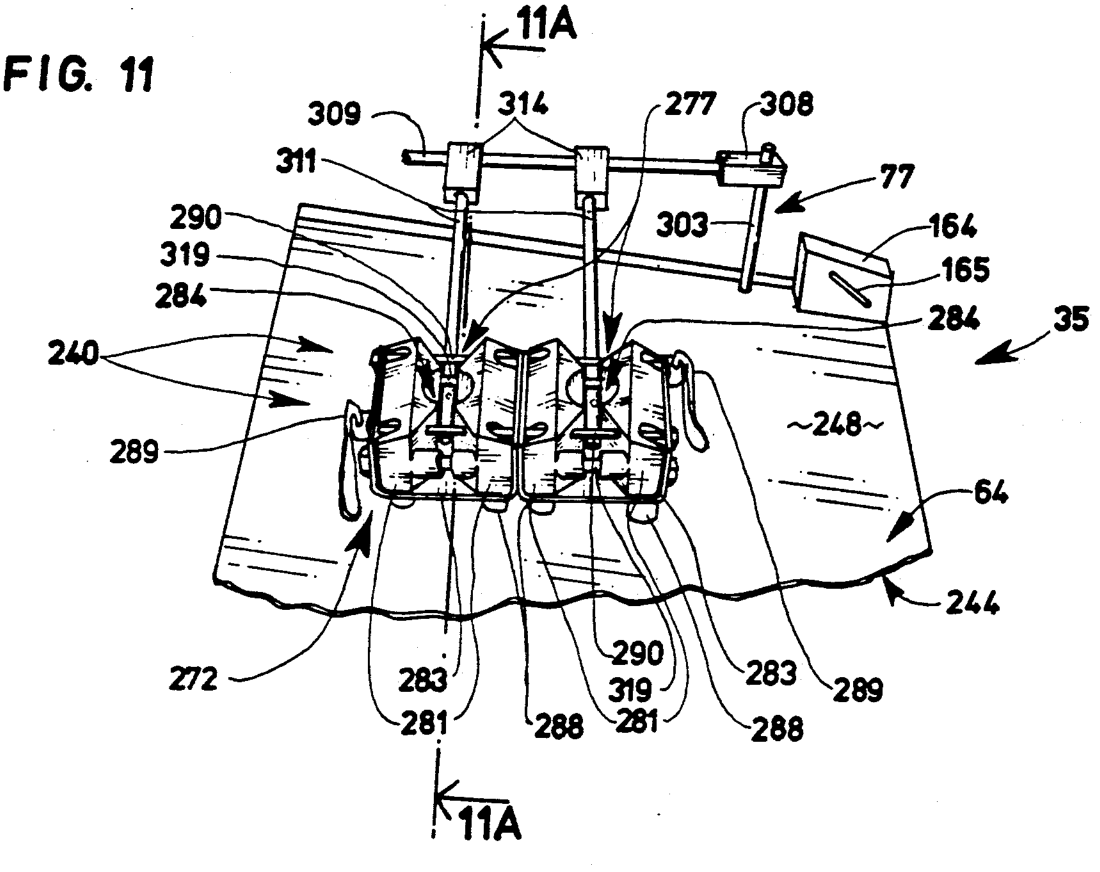

MULTIPLE MODE WHEELCHAIR CONSTRUCTION

BACKGROUND OF THE INVENTION

The present invention relates generally to wheelchairs which may be deployed in multiple and alternative configurations. More particularly, the present invention relates to wheelchairs which are adaptable by the user to conveniently assume a variety of configurations to enhance user ingress and egress to narrow, space-restricted areas.

Conventional wheelchairs can be vexatiously difficult to maneuver, particularly where small, confined areas must be traversed. Business persons confined to wheelchairs who must frequently travel are faced with a variety of obstacles. The complications presented by stairs, escalators and metal detectors are only part of the problem. Ordinary difficulties encountered by wheelchair users when traveling through crowded airports can be overshadowed by the problems in boarding the aircraft. The narrow aisles cf commercial aircraft are a significant impediment to the traveling wheelchair user. Such individuals usually must check their personal wheelchair as baggage, thus limiting personal autonomy and comfort. The physical assistance of airline personnel or others is subsequently required.

Most airlines attempt to accommodate wheelchair-confined passengers by temporarily substituting lightweight, low, profile wheelchairs of reduced dimensions. Such chairs facilitate unobstructed clearance and passage through the narrow aisles. Exemplary of such "temporary" airline wheelchairs are those chairs depicted in U.S. Pat. Nos. 4,639,012 and 4,678,202 issued to Jenson on Jan. 27, 1987 and July 7, 1987, respectively. In my opinion such prior art wheelchairs are designed strictly for short-term use, and besides aggravating the user, they provide minimal comfort. All such prior art wheelchairs known to me are ineffective for long-term, everyday use.

One major disadvantage associated with temporary airline wheelchairs is that the handicapped passenger has no opportunity to move about independently in the plane after he is seated. After seating, the chair is stowed out of reach. Moreover, considerable inconvenience and delay is experienced after landing, since the handicapped passenger must wait to be transported by the airline staff to the terminal. Once the destination is reached, the handicapped user must switch back to his everyday wheelchair. First, however, he must endure the inevitable delays associated with retrieval of his chair.

Many find this loss of independence extremely inconvenient and uncomfortable. Hence it is desired to provide a full-size wheelchair which can be quickly disassembled and carried with the passenger for storage on board the aircraft. Additionally, it is desired to provide such a wheelchair which may be selectively configured at will to enable the individual to move about independently in space-restricted areas such as airline aisles and the like.

Known conventional wheelchairs are also inconvenient for use in the conventional business office. Efficient access to conventional office desks, file cabinets, computer tables, and book shelves is generally compromised for the wheelchair-using business person. Elevated service counters in restaurants, stores, and banks are also typically out of reach of the individual seated in a wheelchair. Similarly, it is difficult for those in wheelchairs to comfortably approach conventional lecterns or podiums found in courtrooms or other public places. It is also extremely difficult for such individuals to comfortably mount popular vehicles such as jeeps, vans, and pickup trucks.

Thus the wheelchaired individual experiences inconvenience, loss of independence, discomfort, and delay in conducting routine business transactions. But to make matters worse, conventional wheelchairs also hinder the handicapped individual in the performance of countless routine household tasks. For example, elevated kitchen cabinets, closet and refrigerator shelves, and other storage facilities are generally out of reach. Hence it is desired to provide a wheelchair which may be conveniently user-adjusted and/or configured to enable access to all types of areas encountered in various business and household settings.

A further disadvantage associated with known prior art wheelchairs is that the large wheels are permanently positioned on the rear of the frame. The user must remain in the same awkward position, with the torso extended forward and the arms reaching backward to propel the chair. After extended periods of use the individual's arms, back, and shoulders can tire and become strained. Additionally, it is often quite difficult to maneuver the chair comfortably with the drive wheels in the rear. Hence it is desired to provide a wheelchair which may be readily reversibly oriented at the user's option so that the large drive wheels are in front for comfort and enhanced maneuverability.

Over the years, various improvements have been introduced to overcome difficulties experienced in maneuvering wheelchairs. For example, a wide variety of folding wheelchairs have been proposed in the prior art which facilitate convenient storage for travel. Foldable wheelchairs are disclosed in the following U.S. Pat. Nos. 4,025,088, issued May 24, 1977 to Rothschild; U.S. Pat. No. 4,326,732, issued to Gall Apr. 27, 1982; Dion U.S. Pat. No. 4,371,183 issued Feb. 1, 1983; U.S. Pat. No. 4,542,918 issued to Singleton on Sept. 24, 1985; U.S. Pat. No. 4,577,878 issued to Roy Mar. 25, 1986; U.S. Pat. No. 4,607,860 issued Aug. 26, 1986 to Vogel; U.S. Pat. No. 4,684,171 issued Aug. 4, 1987 to Roy, U.S. Pat. No. 4,736,960 issued to Batty, Apr. 12, 1988; and Design Patent No. D277,949, issued Mar. 12, 1985 to Minnebraker. Nassiri, U.S. Pat. No. 4,592,570 issued June 3, 1986 comprises means for adjustment of the orientation of the seat and convenient quick-release wheels to facilitate folding for storage.

Other improvements are directed to enhanced wheelchair comfort Rodaway, U.S. Pat. No. 3,881,773 issued May 6, 1975 employs a reclining back; Rodaway U.S. Pat. No. 3,990,745, issued Nov. 9, 1976 teaches the use of a removable back to facilitate convenient transfer from the wheelchair to a bed or other support. Presty U.S. Pat. No. 3,584,890 issued June 15, 1971 comprises an arm rest assembly which may be removed and used as a walker to assist the wheelchair patient in rising from the chair.

Minnebraker U.S. Pat. Nos. 4,351,540 (Sept. 28, 1982); U.S. Pat. No. 4,515,383 (May 7, 1985); U.S. Pat. No. 4,477,098 (Oct. 16, 1984); D269,172 (May 31, 1983); and D271,679 (Dec. 6, 1983) disclose wheelchairs which can be readily adapted for use by individuals of different sizes and physical capabilities. The Minnebraker designs are also ideally suited for participation in wheelchair sports activities. Other wheelchairs specifically directed to use for sporting activities are proposed by Sanaski, U.S. Pat. No. 4,166,631, issued Sept. 4, 1979; and Farnam, U.S. Pat. No. 4,545,593 issued Oct. 8, 1985. The seat of the last-mentioned Farnam chair may be selectively adjusted for comfortable height and tilt.

Various others have directed their attention to providing width-adjustable chairs specifically for navigating narrow passageways. Haury, U.S. Pat. No. 4,082,348 issued Apr. 4, 1978 comprises adjustable transverse frame members cooperative with flexible seat members to facilitate width adjustment. U.S. Pat. No. 4,730,842 issued Mar. 15, 1988 to Summers teaches the use of split clamps for facilitating horizontal adjustments to the seat. Pivotal foot plates facilitate convenient passage through narrow areas. The reduced-width wheelchair disclosed by Rodaway in U.S. Pat. No. 4,164,354 issued Aug. 14, 1979 comprises a scissor-type foldable frame which mounts the front and rear wheels in parallel alignment. Volin U.S. Pat. No. 4,648,615 issued Mar. 10, 1987 comprises rotatable arm supports which may be pulled inward to narrow the wheelchair frame. for enabling passage in space-restricted areas.

One prior art patent of particular relevance to my invention is Ferguson U.S. Pat. 4,098,521 issued July 4, 1978. When the large rear wheels of the Ferguson chair are removed, the chair may be tilted to engage secondary wheels mounted in alignment with the narrow interior frame. The arm and foot rests may be conveniently pivoted away or removed to substantially reduce the overall width. While the chair is highly maneuverable, it presents certain disadvantages. For example, the Ferguson chair comprises a rather cumbersome framework with secondary drive linkage and foot pedal adjustments. Moreover, there are no convenient means suggested for effectuating seat width or height adjustments. Use of hand-operated levers associated with either side of the chair is also rather disadvantageous. Finally, some difficulty is encountered in manipulating the rear wheel release mechanism.

Finally, in the prior art known to me, various systems are proposed for facilitating quick-release of the chair rear wheels for storage or conversion to a narrower frame. Patents of some relevance to my invention are U.S. Pat. No. 3,847,440 issued Nov. 12, 1974 to Mattson; Anderson, U.S. Pat. No. 4,392,690, issued July 12, 1983; U.S. Pat. No. 4,474,385 issued to Costello on Oct. 2, 1984; and, Costello U.S. Pat. No. 4,582,448 issued Apr. 15, 1986; U.S. Pat. No. 4,679,862 issued July 14, 1987 to Luo.

The novel wheelchair construction of the present invention addresses many of the problems heretofore encountered with the use of conventional prior art chairs. Most importantly, the present chair provides convenient means which greatly improve the individual's ability to adapt the chair for a variety of situations.

SUMMARY OF THE INVENTION

My new wheelchair invention is well-adapted for use by the wheelchaired businessman who must travel frequently and be able to maneuver independently in various business settings. The instant wheelchairs can be selectively configured by the user to greatly enhance comfort and convenience, and they can be efficiently disassembled for stowage and transportation.

In the preferred embodiment, the wheelchair comprises a comfortable seat adjustably disposed upon a foldable frame forming an undercarriage which can be readily collapsed for travel The frame comprises an interlinked system of parallelogram linkages which enables it to be substantially flattened during collapse. Large spoked drive wheels are secured with quick-release wheel mountings which allow the user to easily remove the drive wheels to temporarily enhance the wheelchair clearance. The user must merely tilt the chair to each side to engage a pair of auxiliary support wheels disposed upon the rear of the frame, and then remove the large wheels in order to substantially narrow the chair width. Subsequent maneuvering through narrow, restricted passageways such as aircraft aisles is thereby enhanced.

For enhanced comfort and improved mobility, the seat may be reversibly mounted so that the large drive wheels are positioned toward the front rather than the rear of the frame. Importantly, this adjustment may be accomplished in seconds by the user without the use of tools. Moreover, the chair thus oriented requires much less effort to propel. Thus, for example, a quadriplegic with severe restriction of his upper extremities can much more easily propel the chair than he would otherwise.

Additionally, the seat height may be conveniently raised or lowered by engagement of pneumatic cylinders so that the individual may comfortably access and use furniture and equipment of different types and sizes. This is especially critical to the businessman who frequently travels and must maneuver vertically in different business settings. The pneumatic cylinders are preferably disposed in the form of a removable power pack which may be quickly removed or installed from the frames of the various embodiments. Preferably an extensible sleeve system is interfitted with the collapsible frame. Support bars extending between the sleeve system and the parallelogram linkages brace the undercarriage, and synchronize the parallelogram linkages. The sleeve system mounts the power pack, and the power pack may be reversibly mounted on the sleeves to in effect reverse the drive wheel position.

In alternative embodiments, the seat is mounted upon a rigid "knock-down" frame which can be quickly reduced to smaller components which can be carried easily in a briefcase or stored under the passenger's seat. While the sleeve system is not extensible, in most other respects it functions the same as in the first embodiment. The pneumatic cylinder power pack readily mounts to the sleeve system for ease of assembly and disassembly, and the power pack may be quickly reversed. Auxiliary wheels enable the main drive wheels to be temporarily removed. In one form of the invention the auxiliary wheels comprise an "outboard" unit which can be retrofitted to the frame of a wheel chair.

With all of the embodiments the user/passenger may thus move about independently in an airplane and is not required to wait to be transferred to the gate by airline attendants.

Thus it is a fundamental object of the present invention to provide wheelchairs which enable convenient passage through and access to areas generally inaccessible to conventional wheelchairs.

A similar basic object of the present invention is to provide wheelchairs which may be readily adjusted by the user for convenient maneuvering through narrow passageways such as airline aisles and the like.

Another broad object of the present invention is to provide wheelchairs which may be conveniently adjusted or configured by the user to facilitate ergonomic access to conventional fixtures and furniture likely to be found in a typical business office.

Yet another broad object of the present invention is to provide wheelchair designs of the character described which facilitate comfortable and convenient airline travel.

A related object is to provide a full-size wheelchair which can be quickly reconfigured and carried with the passenger for stowage on commercial aircraft.

Still another basic object of the present invention is to provide a wheelchair in which both the seat height and the carriage width may be readily adjusted for enhanced maneuverability and comfort.

A further object of the present invention is to provide a wheelchair which permits quick and easy removal of the main wheels for passage through narrow areas.

Another object of the present invention is to provide a wheelchair which may be reversibly oriented with the large drive wheels in front.

A similar object of the present invention is to provide a wheelchair of the character described which may be readily adjusted and reversibly oriented by the user without the use of special tools.

A related object of the present invention is to provide a wheelchair which may be comfortably used by quadriplegics having severe restriction of the upper extremity as well as by paraplegics having strong upper arms.

Yet another object of the present invention is to provide wheelchairs of the character described on which the seat may be selectively lowered or elevated to permit access to hard-to-reach areas.

A related object of the present invention is provide wheelchairs of the general nature described which facilitate access to service counters, shelves, vehicles, office equipment, and other generally inaccessible areas.

A further object of the present invention is to provide a collapsible wheelchair frame for convenient storage and transport.

An additional object of the present invention is to provide wheelchairs with a pneumatic system for convenient carriage adjustment.

Still another object of the present invention is to provide a wheelchair of the character described which can be conveniently collapsed and carried in a briefcase for travel.

An additional object of the present invention is to provide a wheelchair of the character described which can be reversibly oriented so that the drive wheels are positioned on the front of the carriage.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 10 is a fragmentary, perspective view of the preferred seat mounting apparatus, with portions thereof broken away, shown in section, and/or omitted for clarity;

FIG. 11 is a fragmentary, bottom perspective view of the preferred seat mounting structure, with portions thereof broken away and/or omitted for clarity;

FIG. 11A is a fragmentary, partially sectional view taken generally along line 11A—11A of FIG. 11, in which arrows depict pivotal movement of the pneumatic actuator, and with portions thereof broken away or shown in elevation for clarity;

DETAILED DESCRIPTION

Figure 1:
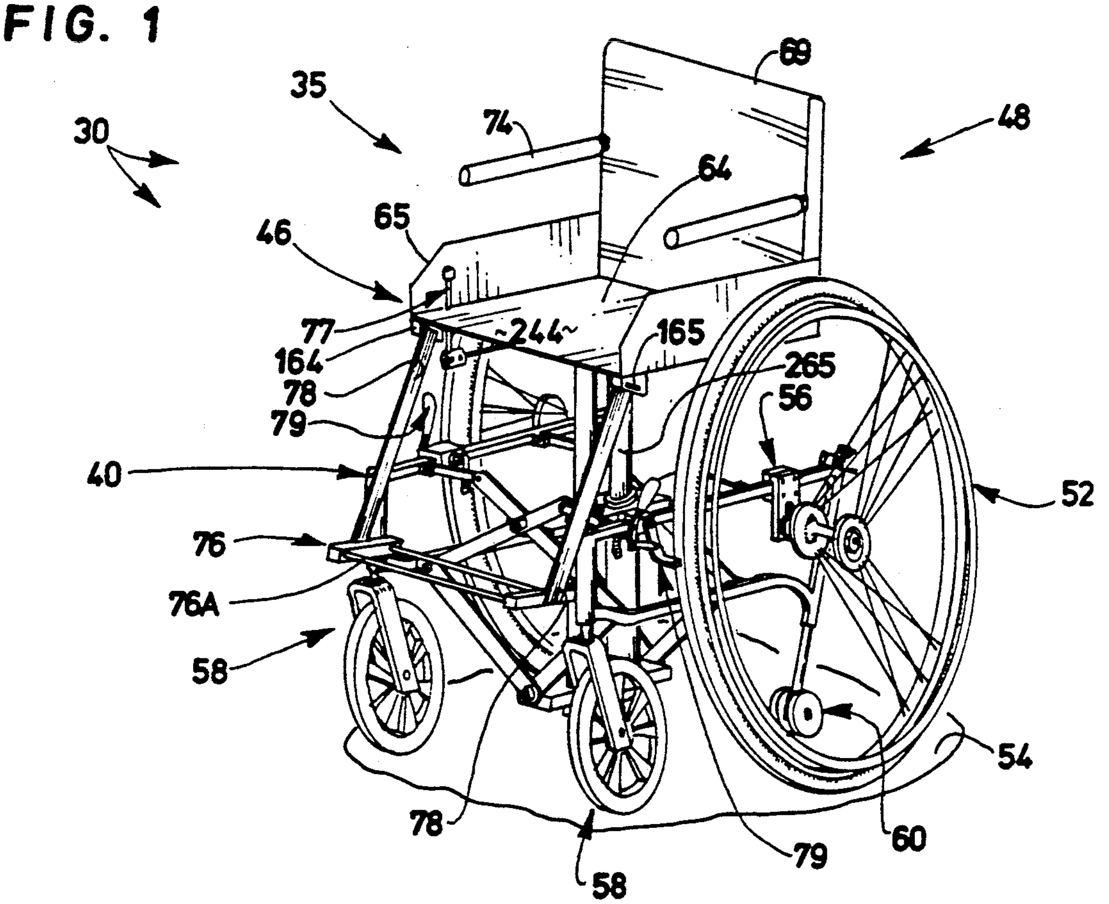
FIG. 1 is a fragmentary perspective view of the preferred embodiment of multiple mode wheelchair constructed in accordance with the teaching of this invention, with portions thereof broken away and/or omitted for clarity.
Figure 15:
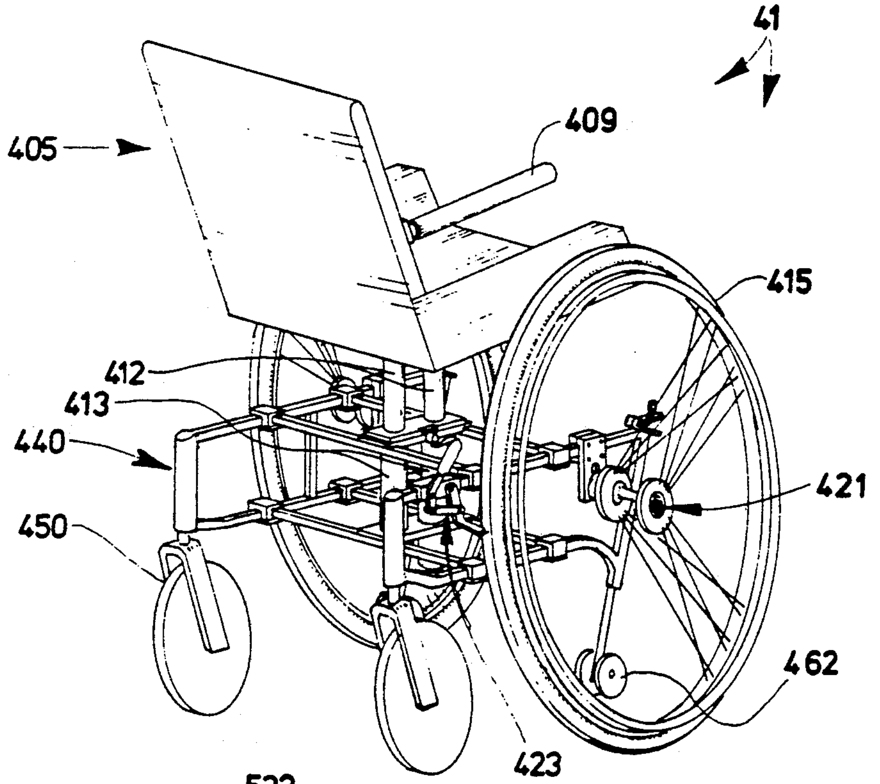
FIG. 15 is a rear perspective view of an alternative wheelchair, in which the seat is oriented in a reversed position, and with portions thereof broken away and/or omitted for clarity.

With reference directed now to the appended drawings, the primary embodiments of my multiple mode wheelchair construction are shown pictorially in FIGS. 1 and 15. The preferred multiple mode wheelchair illustrated in FIG. 1 has been broadly designated by the reference numeral 30. Wheelchair 30 comprises an adjustable seat 35 supported upon a unique collapsible and folding frame which has been broadly designated by the reference numeral 40. As will be explained in greater detail hereinafter, frame 40 is configured so that its sides may be folded together after the seat and wheels have been separated and removed. An alternative embodiment, broadly designated by the reference numeral 41 (FIG. 15), comprises a collapsible, knock-down frame which may be readily disassembled for stowage. Both wheelchairs incorporate a plurality of common structural features to be described hereinafter which permit the user to conveniently alter the wheelchair configuration for greater comfort, enhanced access to fixtures and appliances, and optimum overall maneuverability.

Figure 2:
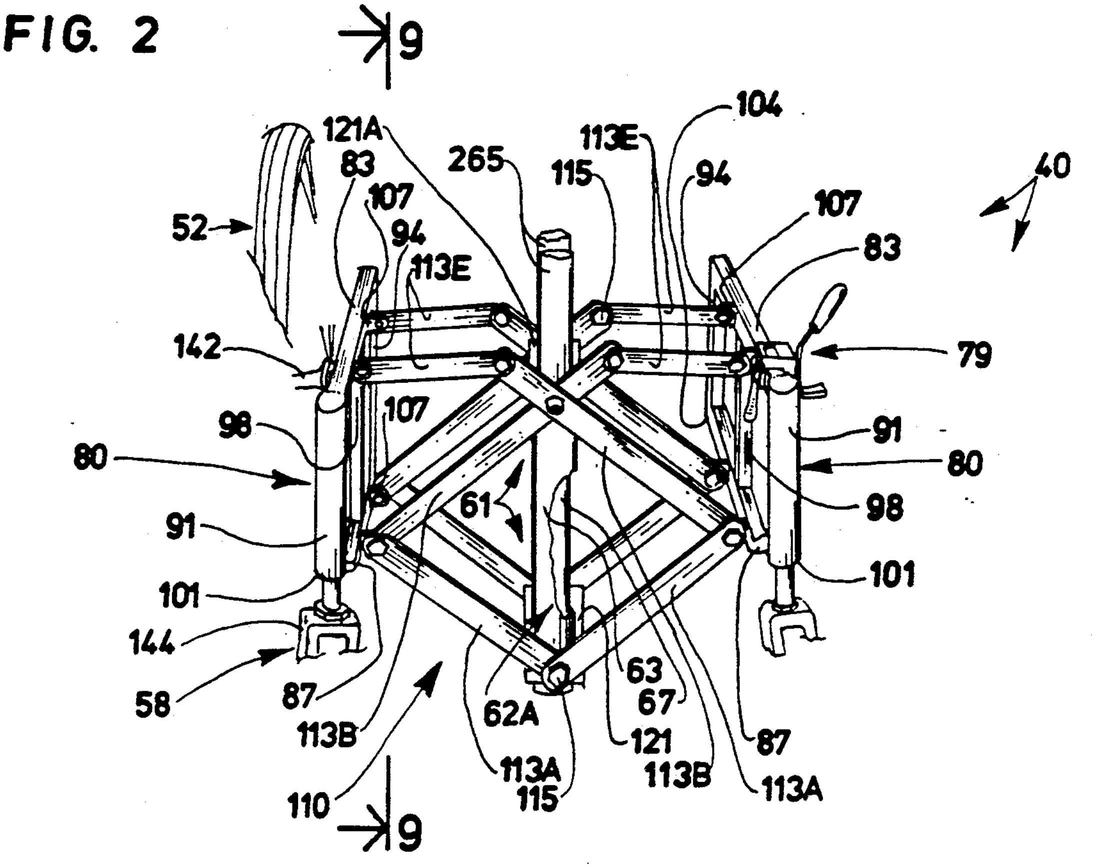
FIG. 2 is an enlarged, fragmentary, front perspective view of the folding frame disposed in a normal operative position, with portions thereof broken away and/or omitted for clarity.
Figure 3:
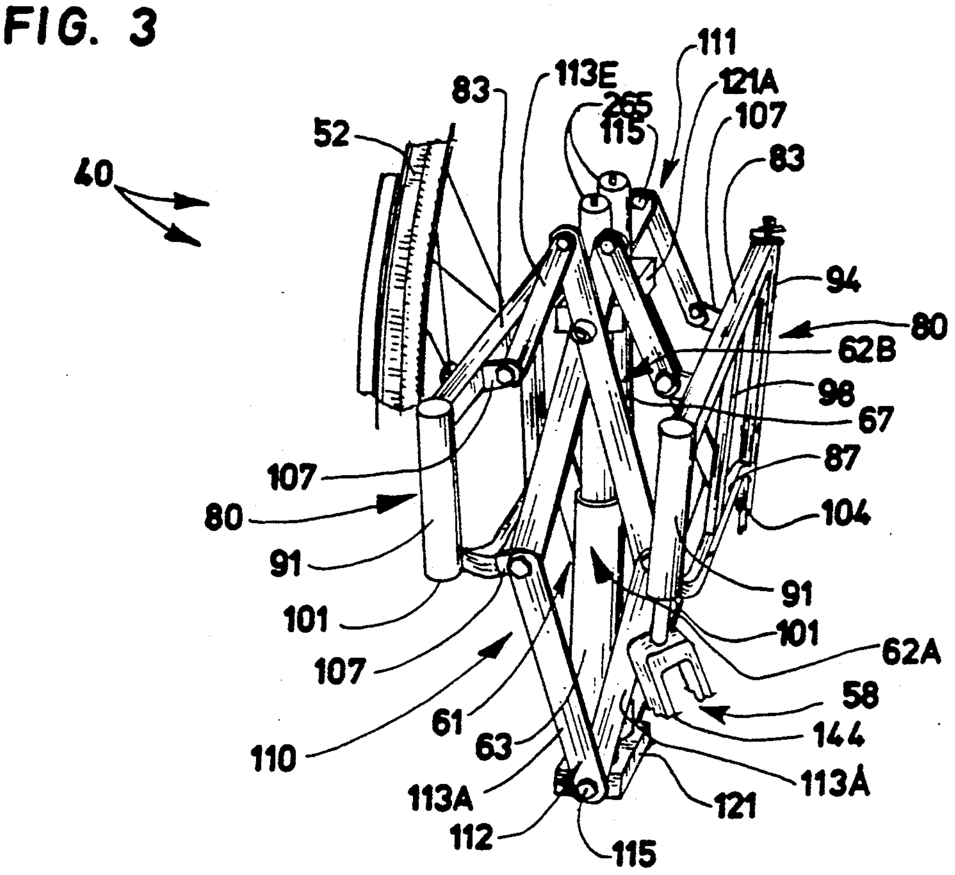
FIG. 3 is a fragmentary, trimetric view of the folding frame illustrated in a collapsed position, with portions thereof broken away and/or omitted for clarity.
Figure 4:
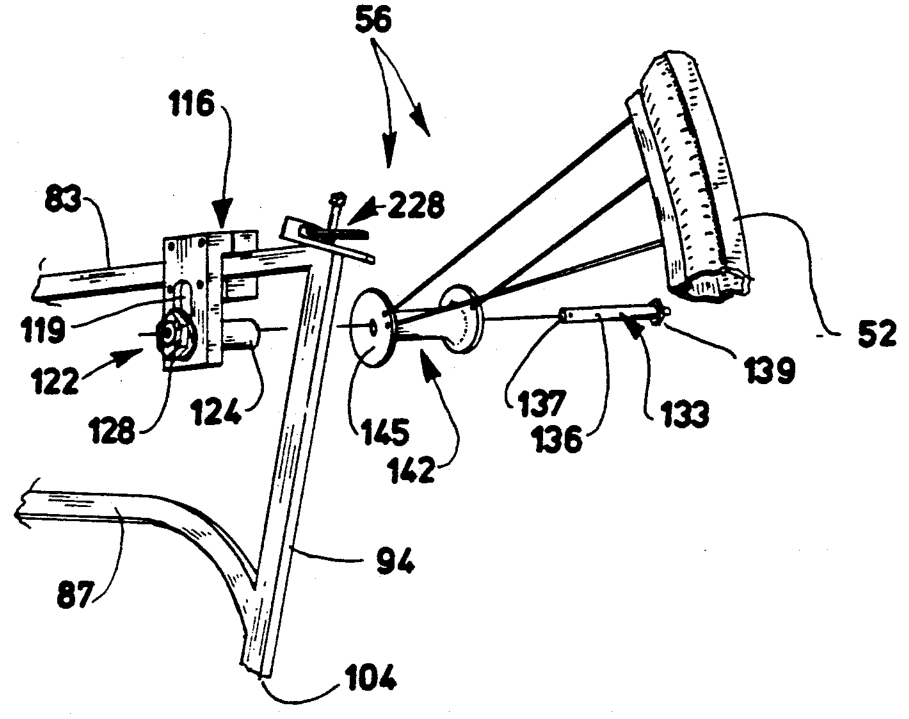
FIG. 4 is a fragmentary, exploded, rear perspective view of the preferred quick-release drive wheel assembly, with portions thereof broken away and/or omitted for clarity.

With primary emphasis directed to FIGS. 1–4, wheelchair 30 broadly comprises a front 46 and a spaced-apart rear 48. A pair of conventionally spoked drive wheels 52 are removably mounted toward the rear 48 of the frame for access by the user. The wheels enable the user to propel and steer wheelchair 30 over a typical supporting surface such as floor 54. The drive wheels 52 are preferably mounted to the frame via quick-release assemblies generally designated by the reference numeral 56 (FIG. 4 ). A pair of smaller caster wheels 58 are removably associated with the front 46 of the frame. A pair of small auxiliary wheel systems 60 project downwardly from the rear 48 of the frame, and are normally offset from the floor 54. As will be described in more detail later, the preferred auxiliary wheel systems 60 may be selectively deployed for support when the drive wheels 52 are removed, so that the wheelchair 30 may roll through narrow passageways such as aircraft aisles.

The removable seat 35 preferably comprises a cushioned platform 64 on which the user sits, a pair of side walls 65, and a cushioned seat back 69. Portions of the cushions are seen in FIG. 10. The armrests 74 are preferably removably mounted to the seat back. A footrest 76 extends angularly downwardly from seat platform 64 forward of frame 40. A seat control handle system 77 extends adjacent one side wall 65. Hand brakes 79 associated with the large drive wheels 52 may be employed to lock the wheelchair in place at a desired location.

Figure 5:
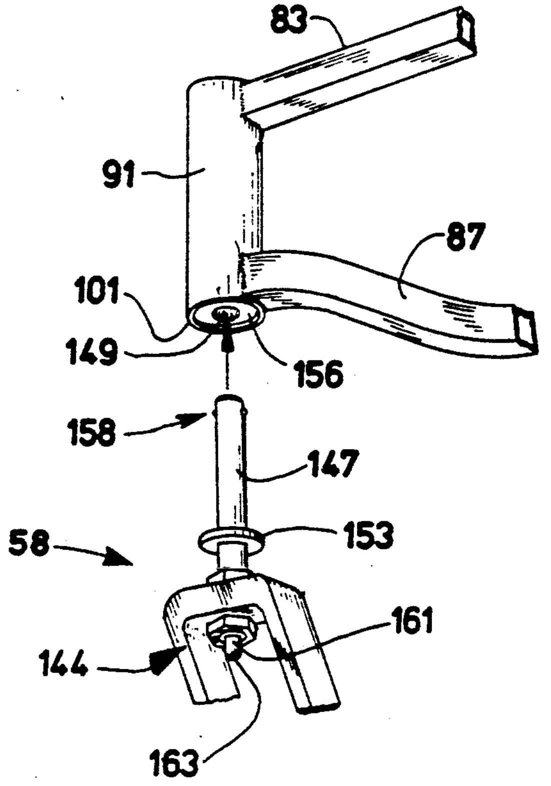
FIG. 5 is a fragmentary, partial exploded perspective view of a preferred caster wheel mounting assembly.

With primary reference directed now to FIGS. 2 and 3, frame 40 comprises a pair of rigid sides 80 preferably fabricated of T-6061 Aircraft grade aluminum tubing. Sides 80 are of generally rectangular configuration, each comprising a top rail 83 and a bottom rail 87. Top rail 83 and bottom rail 87 are generally horizontally disposed and maintained in generally parallel, spaced-apart relation by rigid, vertical front tube piece 91 and spaced-apart rear end piece 94. A rigid brace 98 extends vertically between top rail 83 and bottom rail 87 roughly midway between tube piece 91 and end piece 94. Pieces 91 and 94 are preferably tubular and both are open at their lower ends 101, 104 respectively (FIGS. 4, 5). Piece 91 forms a mandrel to swivel the caster wheels 58. Piece 94 receives the auxiliary wheel systems 60 as described hereinafter. Frame sides 80 comprise a plurality of rigid tabs 107 which extend inwardly toward the interior of frame 40 and are pivotally connected to the frame linkage assembly 110, which operatively connects the sides and enables them to be controllably folded toward or away from one another.

Figure 9:
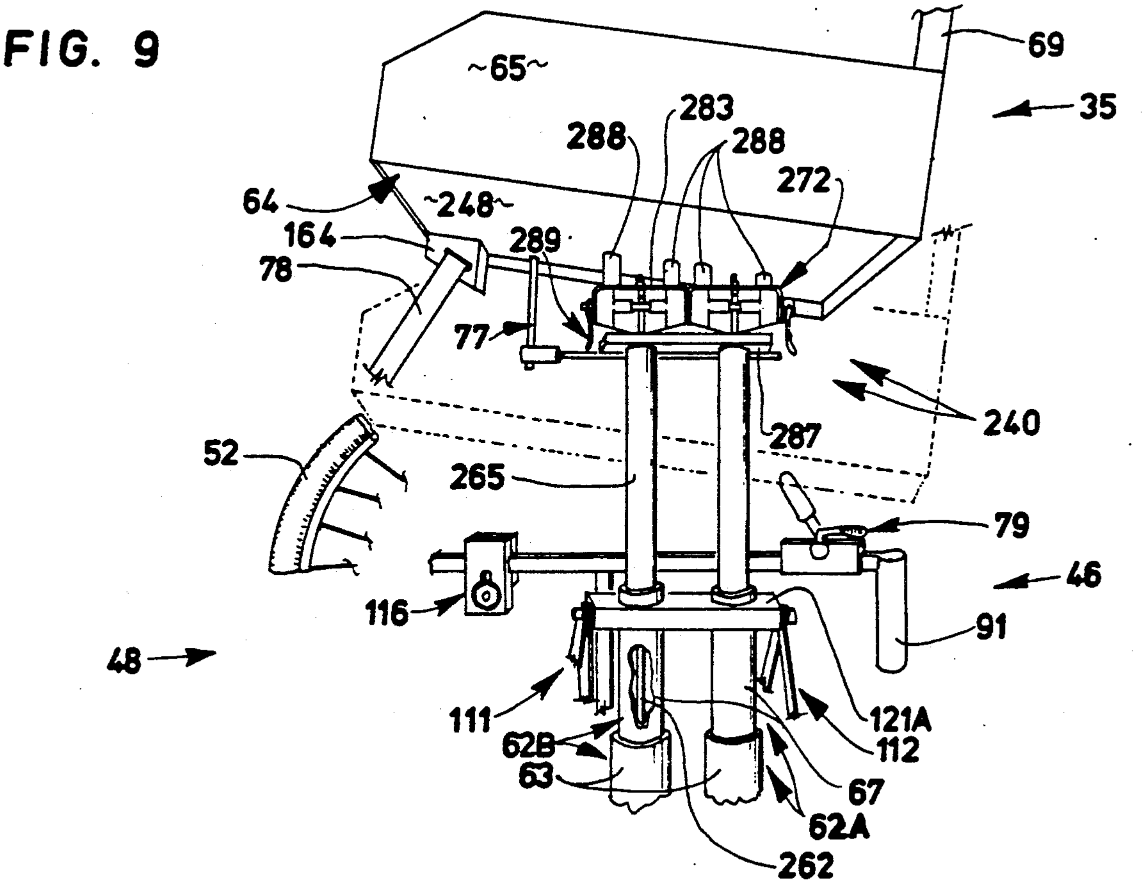
FIG. 9 is a fragmentary, perspective view of the wheelchair taken generally along line 9—9 in FIG. 2 showing the seat in an elevated position, with portions thereof broken away, shown in section, or omitted for clarity, and with the retracted seat position partially drawn in dashed lines.

The frame linkage assembly 110 comprises a pair of identical spaced apart parallelogram linkages 111 and 112 (FIGS. 3, 9). Each parallelogram linkage 111, 112 individually comprises a pair of lower rigid links 113A pivotally linked together and secured at their bottom ends to a lower support block 121 (FIG. 2). The tops of links 113A are pivotally coupled to the bottoms of upper links 113B and the tabs 107 at the inner sides of the frame. The tops of links 113B are pivotally coupled to short links 113E extending to the upper inside frame tabs 107. Intermediate their ends, links 113B are pivotally coupled together on opposite ends of an upper support block 121A which extends between parallelogram linkages 111 and 112. As best viewed in FIG. 2, each of the various links 113A, 113B, and 113E comprise elongated lengths of steel or the like drilled at each end to receive suitable fasteners such as bolts 115. Each of the links 113A, 113B are pivotally linked to the bottom rail 87 of each frame side 80. Links 113E comprise shorter lengths of steel of similar configuration pivotally linked to the top rail 83 of each frame side.

Seat 35 is centrally positioned and mounted to frame 40 by a mounting system generally designated by the reference numeral 61. Mounting system 61 preferably comprises twin spaced apart extensible sleeve pairs 62A and 62B, and means to be discussed hereinafter which link the chair to the sleeves. Each sleeve pair comprises a lower sleeve member 63 coaxially receiving an upper sleeve member 67 (FIGS. 3, 9). Sleeve members 63 and 67 are extensible to synchronously cooperate during frame linkage movement. The sleeve pairs 62A and 62B are supported by and extend generally perpendicularly between the upper and lower support blocks 121A and 121 respectively. The lower support block 121 anchors individual sleeves 63 at the frame bottom, and the upper support block 121A (FIG. 3) anchors upper sleeve members 67. Additionally the support blocks extend across the frame linkage assembly 110, synchronizing the aforedescribed parallelogram linkages 111 and 112.

The frame linkage assembly 110 is thus adapted to fold in a scissor-like manner from the "open" or operative position shown in FIG. 2, in which the links assume the generally diamond shaped configuration, to the "folded" or collapsed configuration shown in FIG. 3. When frame linkage assembly 110 is collapsed as in FIG. 3, sides 80 are pressed inwardly together toward the interior of frame 40, and the sleeve pairs 62A and 62B will elongate The frame linkage assembly 110 assumes a generally flat configuration which can be easily stowed and transported.

Seat 35 is vertically adjustable to enable convenient access to various areas previously out of reach to the wheelchaired individual. As best seen in FIG. 9, the user may selectively raise and/or lower the seat between the normal lower position (indicated in dashed lines) and the elevated position. For elevation adjustments the seat mounting system 61 comprises a pair of pneumatic cylinders combined with a synchronization plate 287, and the latter three components are collectively referred to as a "power pack". A preferred pneumatic cylinder is available from Suspa Incorporated, Grand Rapids, Mich., and their gas cylinder assembly model number 17—1 has proven successful.

Preferably a separate cylinder is disposed within each sleeve pair 62A and 62B for selectively extending or retracting. Each pneumatic cylinder comprises a tubular cylinder housing 265 (FIGS. 1-3), which extends out of the upper sleeve 67, and an internal ram 262 coaxially anchored within upper sleeve 67. Cylinder housings 265 are forced vertically upwardly out of the upper support block 121A (FIGS. 3, 9) when the ram 262 is forced out of the housing 265. The housing 265 of each cylinder extends vertically upwardly above support block 121A to and partially through a synchronizing plate 287 (FIG. 9); the cylinder bodies 265 extend partially through plate 287 and engage the preferred seat mounting bracket 272 (FIGS. 10, 11). A pair of cylinders are coupled together with plate 287, and together this combination comprises a removable "power pack". A different tension pair of cylinders for a different user, for example, can be quickly interchanged with the power pack to vary the lift and retraction characteristics.

The seat mounting system has been generally designated by the reference numeral 240. A seat mounting bracket 272 comprises a pair of clamps 277 commonly identified as "floating jaw" clamps. Clamps 277 are dynamically mounted within an enclosed, rigid casing 283. Each clamp 277 comprises a pair of opposed, cooperating jaws 281 forming a central yoke 284 for receiving pneumatic cylinder housing 265. Clamps 277, bracket 272 and the attaching hardware and release mechanism are sold by the aforementioned Suspa Incorporated, in association with the gas cylinder assemblies aforedescribed, under their model number 162—00043. Jaws 281 are selectively clamped and released by manipulation of rotatable cam locks 289 which drive camshafts 290. Camshafts 290 penetrate jaws 281 and extend horizontally across the width of casings 283. Resilient spacers 288 extend vertically upwardly from casings 283 and are secured to the seat platform 64 by suitable bolts 288B (FIG. 10). Preferably spacers 288 are of different lengths, diminishing gradually in size from the front to the rear of seat 35. Thus arranged, spacers 288 incline the seat slightly toward the back 69 to enhance user comfort.

The pneumatic cylinders for seat elevation adjustments are responsive to a seat control handle system broadly designated by the reference numeral 77. With reference to FIGS. 10, 11A, 11, and 13, seat control 77 comprises a rigid, upwardly extending lever 303 which includes a handle grip 304. Lever 303 is positioned adjacent a side of seat 35 for convenient access by the user. Lever 303 penetrates seat platform 64 and is coupled to an elongated header block 308 positioned beneath the seat. Header block 308 controls a transmission 309 which mounts a pair of rigid, spaced apart blocks 315, from which parallel rods 311 outwardly extend. Each rod 311 comprises a free end 316 operatively associated with casings 283. Each rod 311 (FIG. 11A) is rigidly mounted to rotatable pivot shaft 319 between jaws 281 (FIG. 11). Pivotal movement of each rod 311, illustrated by arrows 313 in FIG. 11A, causes rod ends 316 to engage activation valves 324 associated with the upper body portion of the pneumatic cylinders then captured within yoke 284. The latter valves open or close critical gas recycling passageways within the Suspa gas cylinders, facilitating expansion or subsequent retraction of the cylinders.

Figure 6:
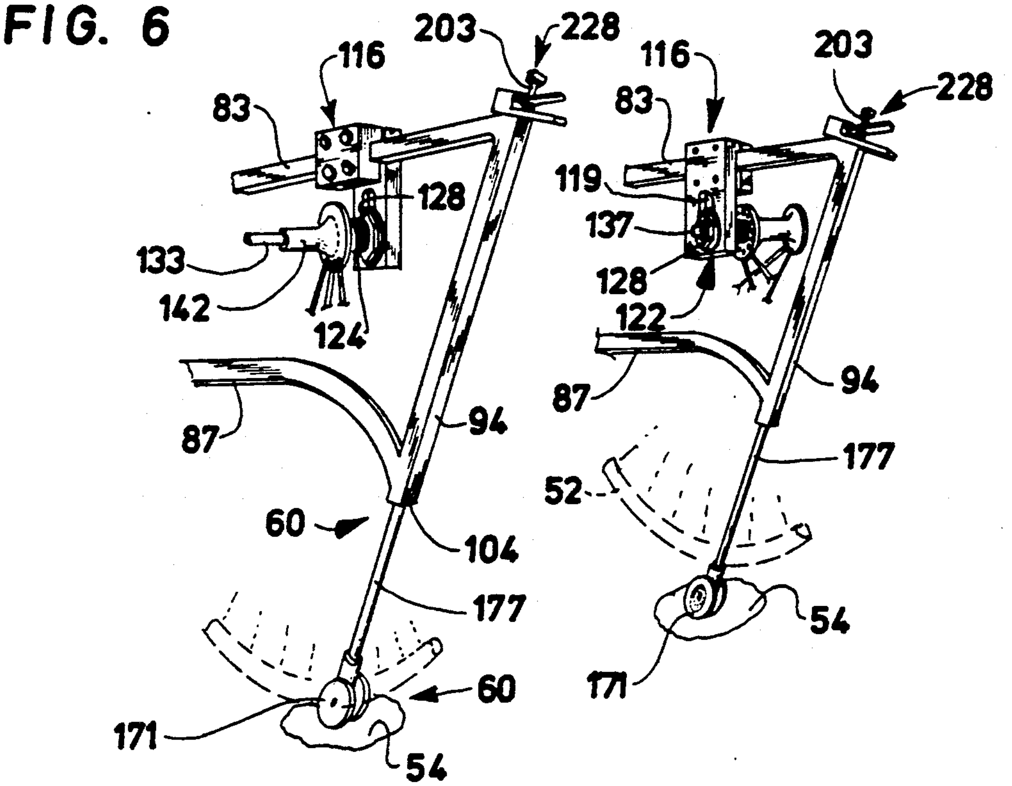
FIG. 6 is a fragmentary, perspective view showing the deployed auxiliary support wheels, with portions of the wheelchair omitted or broken away for clarity.

To further enable convenient disassembly of wheelchair 30 for transport, drive wheels 52 and caster wheels 58 are removably mounted to wheelchair 30. With reference now directed to FIGS. 4 and 6, the drive wheels 52 are coupled to frame 40 by a quick-release wheel mounting assembly 56. Each assembly 56 preferably comprises a rigid mounting bracket 116 compression fitted to top frame rail 83. Bracket 116 comprises an elongated follower slot 119 which mounts a tubular receptacle 122 comprising a rigid, elongated spacer 124 threaded at one end (FIG. 4) to receive nut 128. A rigid pin 133 penetrates the tubular, spoked hub 142 of drive wheel 52 and receptacle 122 to lock the wheel in place. Pin 133 comprises a solid, elongated body 136 terminating at one end in a blunt tip 137 and at the opposite end in a hex head 139. When the wheel is properly installed as illustrated in FIG. 6, spacer 124 contacts the enlarged diameter terminus 145 of spoked hub 142. The spacer 124 is thus adapted to retain the wheel 52 properly spaced apart from frame side 80 so that free rotation of the wheel is not impeded by contact with frame 40.

Pin 133 is preferably locked within receptacle 122 by a latching mechanism which can be selectively released by the user without the use of tools. The preferred latching mechanism comprises a conventional ball latch or grip-roller, which mechanically releases a ball bearing associated with tip 137 of pin 133 when the user presses against head 139 inwardly toward frame side 80. After the pin 133 is thus released, the user merely slides the pin out of receptacle 122 and draws the wheel 2 away from the frame. Thus, no tools are normally required to remove the drive wheels.

Figure 12:
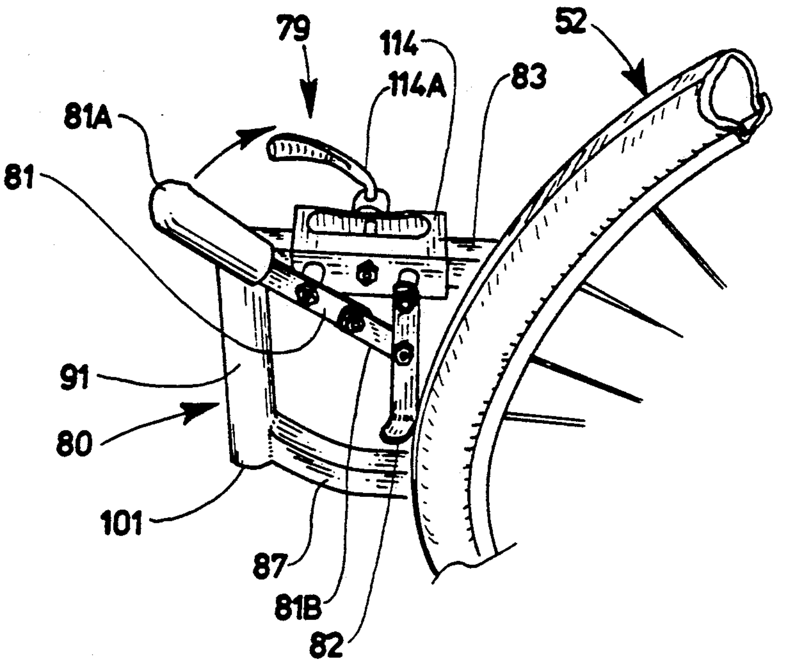
FIG. 12 is a fragmentary, side perspective view of the preferred hand brake, with portions thereof broken away and/or omitted for clarity.

The smaller caster wheels 58 may also be readily removed from the frame 40 without the use of tools. With reference now to FIG. 5, each caster wheel 58 comprises a fork 144 which secures a rigid, upwardly projecting post 147. Post 147 is slidably received within the interior 149 of frame mandrel tube 1. The enlarged-diameter swivel plate 153 associated with post 47 slidably abuts a reduced-diameter collar 156 associated with the lower end of end piece 91 to facilitate swiveling. Fork 144 is retained within piece 91 by the wheelchair load. However, in the interest of safety, the caster wheels are also provided with a ball latch mechanism 158 which is similar to that associated with drive wheels 52. The rigid pin 161 is slidably, coaxially received within post 147. To remove the caster wheels 58 from their mounting, the user must merely press upwardly against head 163 to release the ball latch mechanism 158, and slide the post 147 out of end piece 91. This operation is easily accomplished and necessitates no tools. A suitably narrowed wheelchair profile cannot be achieved unless the hand brakes 79 are removed from frame sides 80 prior to collapse of the frame. The hand brake structure is illustrated in detail in FIG. 12. Each of the hand brakes 79 comprises a brake lever 81 having a cushioned handgrip 81A. Brake lever 81 is pivotally coupled by a rigid, intermediate link 81B to a rigid stop 82. By manipulation of brake lever 81, stop 82 may be forced in and out of frictional contact with drive wheel 52 to brake the wheelchair 30. It can be locked in the braking position since link 81B is moved overcenter.

Brake lever 81 and stop 82 are pivotally coupled to a rigid, removable carriage 114 which is slidably fitted to the top rail 83 of each frame side 80. Carriage 114 is semi-permanently retained in position by a quick release cam lock 114A. This cam lock system, as well as others referenced throughout this disclosure, preferably comprise conventional Scwhinn TM -brand bicycle seat clamps. In order to remove the hand brake 79 when collapsing the chair frame 40, the user must merely unlock carriage 114 by rotating cam lock 114A and lift the hand brake off of top rail 83. The hand brake is thus prevented from interfering with collapse of the frame linkage assembly 110 when the wheelchair is disassembled.

Figure 13:
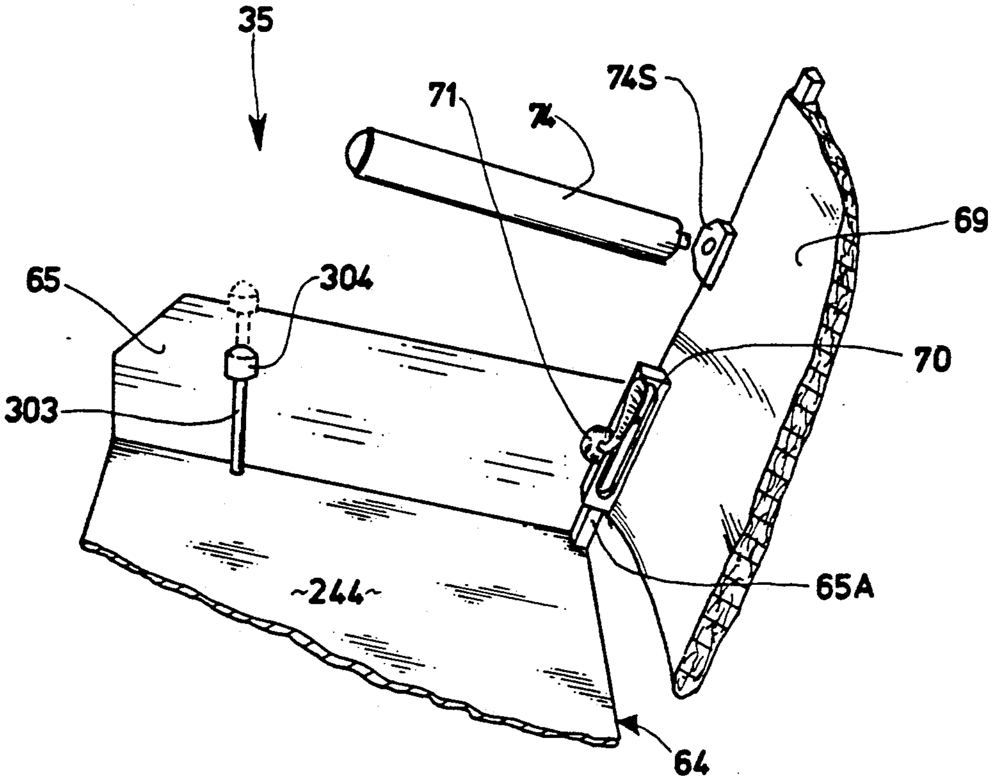
FIG. 13 is a fragmentary perspective view illustrating the seat back and armrest, with portions thereof omitted, shown in section, and/or broken away for clarity.

The user may conveniently disassemble seat 35 and arrange it in a flat, easily transportable disposition. With attention directed to FIGS. 10, 11 and 13, seat platform 64 comprises a user-receptive upper surface 244 and a lower surface 248. Upper surface 244 is preferably covered by a resilient cushion 249 for user comfort. FIG. 13 primarily illustrates disassembly of the seat 35. The seat back 69 is mounted upon a pair of rigid tracks 65A which extend vertically from platform upper surface 244 adjacent side walls 65. A rigid tube 70 coupled to seat back 69 slidably engages each of tracks 65A and may be selectively locked and unlocked by cam lock 71. To disassemble the seat without the use of tools, the user merely rotates cam lock 71 upwardly and pulls the seat back 69 up away from the platform until the track separates from the tube 70. After removing armrest 74 by simply screwing it out of its socket 74S, the user may lay the seat back 69 and the armrest 74 on platform 64 between side walls 65, thus forming a compact package which can be conveniently stored.

The removable seat back 69 also greatly enhances the user's comfortable transfer to another supporting surface. To transfer himself to a sofa or the like, the user may instantly lower the seat height of the wheelchair to match the height of the sofa and then back the wheelchair up to the sofa. After removing the seat back, the user may hold onto the sofa arms and comfortably slide himself out of the wheelchair onto the sofa seat. In an emergency situation, the seat back may be readily removed so that the user may be transferred in a reclined position onto a supporting surface such as a stretcher, gurney, or examining table The footrest 76 (FIG. 1 ) is also easily removable. With joint reference to FIGS. 1 and 10, the preferred footrest 76 comprises a rigid foot plate 76A and a pair of rigid mounting brackets 78. Brackets 78 extend angularly upwardly from each end of foot plate 76A and are semi-permanently coupled to seat 35. Rigid mounts 164 comprise angularly defined slots 165 (FIG. 10) for mating with a tab portion of brackets 78. As best viewed in FIG. 10, mounts 164 are slightly inset from seat side walls 65, so that the distance between mounts 164 is slightly smaller than the length of foot plate 76A. Hence, brackets 78 must be deflected slightly inwardly when being installed. When properly positioned, brackets 78 exert pressure outwardly against mounts 164 and retain brackets 78 within slots 65, so that no fasteners are required. Thus, when disassembling the wheelchair, the user may quickly remove footrest 76 by deflecting the brackets 78 slightly inwardly and sliding them out of contact with slots 165. It will be evident that no tools are required to perform the task.

Thus, when traveling, the user may easily disassemble the wheelchair 30 by first collapsing the seat 35 and removing it as described, removing the footrest 76, and removing the wheels 52, 58. Thereafter, the linkage assembly 110 may be readily folded, and all components arranged into a generally flat unit which can be stored under the passenger seat or in a nearby storage cabinet.

Figure 7:
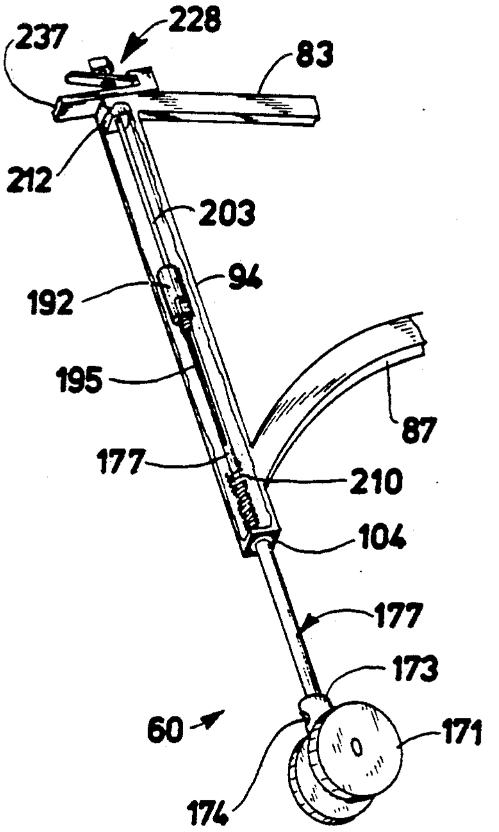
FIG. 7 is a fragmentary, side perspective view of a preferred auxiliary support wheel disposed in a deployed position, with portions thereof broken away for clarity.
Figure 8:
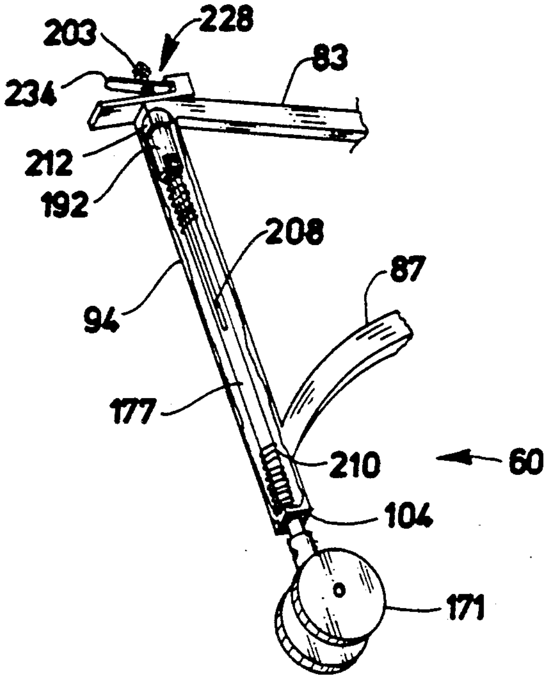
FIG. 8 is a fragmentary, side perspective view of a preferred auxiliary support wheel disposed in a retracted position, with portions thereof broken away for clarity.

Importantly, the user traveling with a commercial airline must also be able to independently access the airplane and maneuver about in wheelchair 30 in order to travel comfortably. The quick-release wheel mounting 56 of the present construction enables convenient passage through the narrow aisles of a conventional airplane and other space-restricted areas. By removing the large drive wheels 52 as described hereinabove, the user may substantially reduce the overall width of the wheelchair. With the drive wheels 52 removed, the frame is supported upon caster wheels 58 and auxiliary wheels 60. As best viewed in FIG. 1, auxiliary wheels 60 are normally elevated out of contact with floor 54 and retained within the rear end piece of frame side 80 when not in use. Auxiliary wheels 60 may be selectively extended from the retracted, "storage" position shown in FIG. 8 to the extended, "deployed" position shown in FIG. 7 when the drive wheels 52 are removed.

Figure 14:
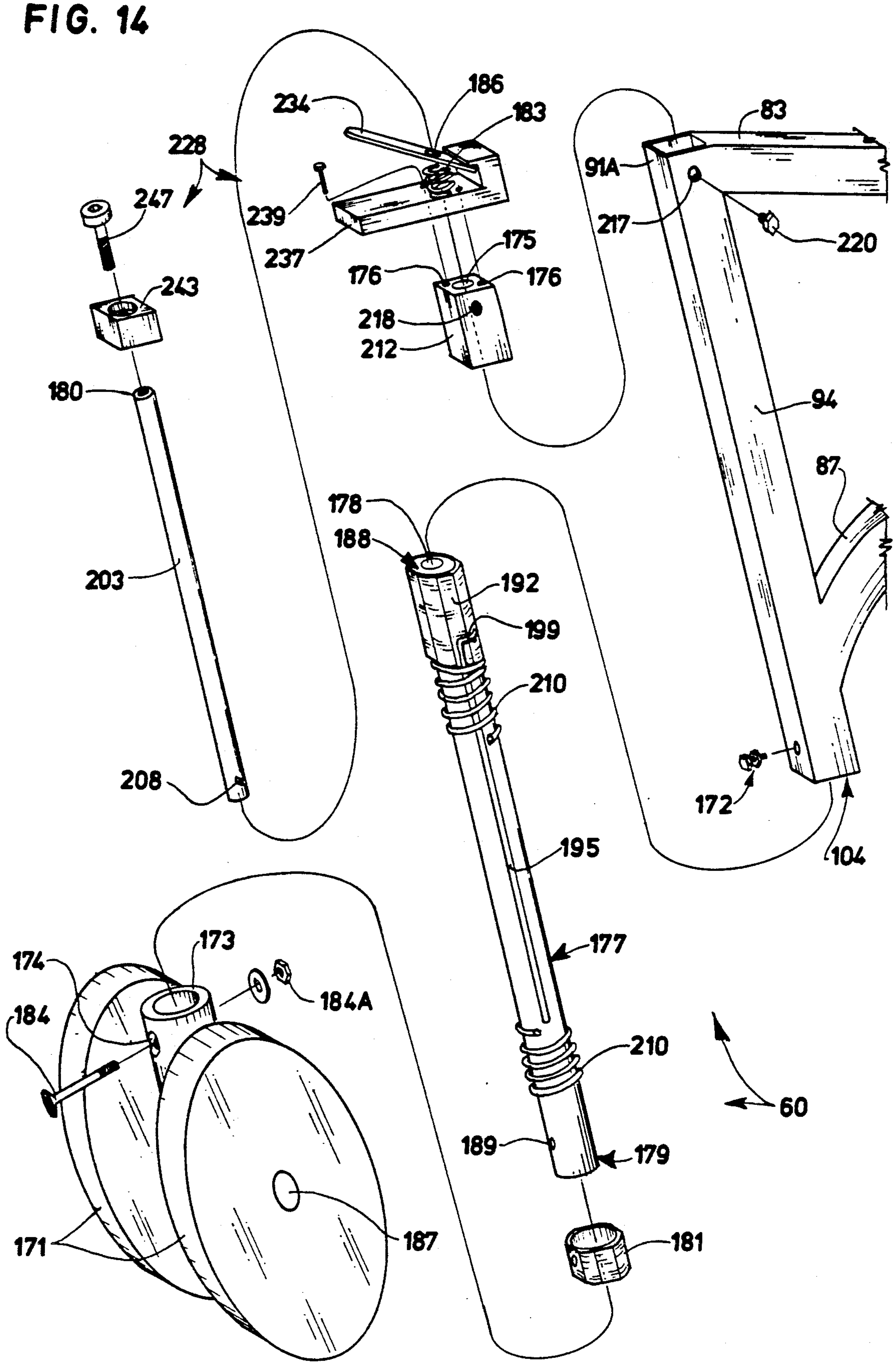
FIG. 14 is an enlarged, exploded fragmentary trimetric assembly view of the preferred auxiliary wheel system, with cooperative portions of the wheelchair frame assembly broken away and/or omitted for clarity.

With primary reference now directed to FIG. 14, a preferred auxiliary wheel assembly 60 comprises a spring loaded extendible wheel mounting strut denoted by reference numeral 177, and an extension lock assembly denoted by the reference numeral 228, both of which cooperate to control the auxiliary roller wheels 171. Strut 177, which is slidably received within tube 94 of frame 40, comprises an upper end 188, a lower end 179 and a hollow interior 178. End 188 is fitted with rigid cap 192 which has been machined flat on four sides to slidably contact the four inner walls of tube 94. Slide bearing 181 is rigidly mounted within bottom 104 of tube 94 by bolt and locknut 172. Bearing 81 functions both to mount strut 177 and as a retainer/stop for the lower end of a coaxially fitted spring 210.

The upper end of strut 177 is retained within tube 94 by block 212 which is rigidly mounted within upper tube end 91A by bolt 220, which penetrates aligned mounting holes 217 and 218. Lock body 237 is rigidly mounted to the top of block 212 by bolts 39 which threadably engage holes 176. The tubular interior 178 of strut 177 coaxially, telescopingly receives an extension rod 203 so that auxiliary wheel elevation can be varied. Rod 203, which includes a cap 243 secured to end 180 by a machine screw 47, traverses passageway 175 into strut interior 178. A follower pin 208 is press fitted into the lower body of rod 203. Pin 208 thus retains rod 203 in strut 177. Guide slots 195 and 99 define the path that pin 208 can travel, thus limiting relative displacement of the wheels from the frame. Rod 203 penetrates binder handle 234 through orifice 186. The binder 1 handle is biased upwardly by captivated spring 183. The lower end 179 of strut 177 frictionally fits within socket 173 and is held rigidly therein by screw 184 (which penetrates orifices 174 and 189) and compression nut 184A. Individual roller wheels 171 are deployed on opposing sides of socket 173 by an axle 187.

Deployment of auxiliary wheel system 60 (FIG. 8) first requires that extension rod 203 be freed by depressing binder handle 234, thereby removing the frictional bind on rod 203. While free, rod 203 is raised until further upward movement is prohibited by pin 208 contacting the upper end of slot 195 (FIG. 14). While still free rod 203 must be rotated counter clockwise to engage pin 208 with channel 199. While still free of binder handle 234 rod 203 is pressed downward, moving strut 177 downward through tube 94 and deploying the roller wheels 171. Upon contact with supporting surface 54 (FIG. 6) the operator tilts the corresponding side of the wheelchair 30 and deploys the auxiliary wheels enough to free drive wheels 52 from contact with surface 54. This procedure is followed for the opposite side of wheelchair 30 thereby deploying both sets of auxiliary wheel systems 60. In this manner drive wheels 52 will be moved out of contact with the ground, and they may both be removed.

With the overall width of the wheelchair reduced, maneuvers through narrow aisles, hallways and the like are facilitated. The airline passenger may thus wheel his own wheelchair into the airplane, remove the large wheels and brakes for subsequent passage down the aisle, find his seat, quickly disassemble the wheelchair without tools, and store the disassembled wheelchair in the cabin. When he arrives at his destination, he may reassemble the wheelchair and move about independently or with minimal assistance from the airline staff. Hence the user is spared a great deal of the inconvenience and time typically associated with airplane travel.

OPERATION

Besides enhancing the user's ability to travel independently, wheelchair 30 also greatly aids the user to function comfortably in various business and social settings. By virtue of its novel mounting, the seat 35 may be reversed relative to the frame, so that the large drive wheels 52 are positioned substantially in front of rather than behind the user. Reversing the seat position in effect puts the drive wheels in front. Whether or not the wheel or seat position has been reversed, seat elevation can be varied as aforedescribed. Reversibly orienting the wheelchair as illustrated in FIGS. 9 and 15 permits the user to selectively change positions, alternatively exercise different muscle groups, and maneuver more easily through space-restricted areas. Additionally, the seat may be concurrently lowered and elevated to enable access to hard-to-reach areas such as upper cabinets, shelves, desks, counter tops, and podiums.

To remove and/or reversibly orient the seat 35 on frame 40 the user must first dismount wheelchair 30 and position himself so that he may comfortably access the seat mounting system 240 (FIGS. 10, 11). Rotation of cam locks 289 will release jaws 281, so that the seat may be easily lifted off pneumatic cylinder body portion 265. After rotating the seat 180 degrees so that the seat opens toward frame rear 48, the user replaces the seat so that the cylinders properly register within yokes 284, and then firmly clamps the jaws closed. It will be appreciated that no special tools are necessitated for this operation, and the user is thus afforded a greater degree of independence and comfort. Because casings 283 are preferably disposed about the center of gravity of the seat, the seat is comfortably positioned relative to the frame regardless which orientation it assumes.

For seat elevation adjustment, the user pulls lever 303 upwardly as indicated in dashed lines in FIG. 13. Header 308 is lifted vertically upwardly toward the seat platform 64. Blocks 314 are raised (i.e. moved downwardly as viewed in FIG. 11), and as rods 311 pivot the free rod ends 316 press downwardly against cylinder activation valves 324 (FIG. 11A). Air valves 324 route air captured within the cylinders to fully extend them; when the cylinders are extended, and the valve 324 is thereafter closed, the seat remains elevated.

The pneumatic cylinders are readily available in sizes which provide varying amounts of thrust. In my experience, the combined thrust of the two cylinders should be approximately ten pounds less than the weight of the user. In order to elevate the seat, the user activates switch 324 to provide upward thrust to the seat. The user then applies approximately ten pounds of downward pressure to the top of the drive wheels with his arms to supplement cylinder thrust. The seat will then rise to the desired height. Deactivation of switch 324 locks the system at the selected level. To lower the seat, the user activates switch 324 and his body weight will cause the seat to lower. Release of the switch will hold the seat at the preferred height.

Thus the user may readily raise and lower himself to comfortably reach upper shelves, counter tops, tables, and other hard-to-reach areas. The latter-described seat elevation feature is particularly useful for enabling the individual to comfortably board high-profile vehicles such as small aircraft, pick-up trucks, jeeps, and the passenger vans which are commonly used for transporting airline passengers to and from an airport terminal.

ALTERNATIVE EMBODIMENTS

Figure 18:
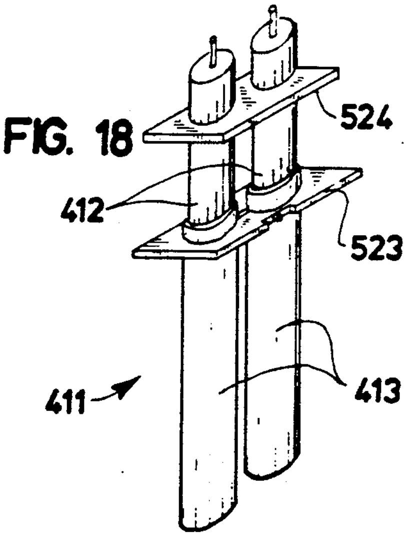
FIG. 18 is a fragmentary, perspective view of the preferred removable power pack assembly.

Any or all of the various advantageous adjustment features described hereinabove may be incorporated into the alternative embodiment of my wheelchair construction depicted in FIGS. 15–16. Alternative wheelchair 41 comprises a rigid, box-like frame 440 whose opposite sides are semi-permanently connected by cross braces generally designated by the reference numeral 485. The frame supports a cushioned seat 405 similar to seat 35 having removable armrests 409. Seat 405 is preferably mounted on a removable power pack assembly 411 (FIG. 18) comprising a pair of pneumatic cylinders 412 coaxially disposed within sleeves 413 which are secured together by brace plate 523. The power pack is centrally disposed within knockdown frame 440, and removably disposed between frame support plates 521 and 522. Sleeves 413 function somewhat similarly to sleeve pairs 62A, 62B already discussed, in that they house the pneumatic cylinders, and couple the frame to the seat. But they include only one tubular member, since they need not be extensible.

Each sleeve 413 (FIG. 16) extends between lower support plate 521 and upper support plate 522. Plates 521 and 522 extend between frame braces 485, and they are similar in seat-supportive function to support blocks 121 and 121A discussed previously. A synchronizing plate 524 (FIG. 18) similar to plate 287 already discussed and parallel with brace plate 523 extends between the pneumatic cylinders 412. The sleeve assemblies (i.e. power pack 411) are removably locked in place on the frame by cam locks 414 (FIG. 16). When clamps 414 are released, the power pack assembly easily removes from the frame.

The large drive wheels 415 are similarly mounted on quick-release axles 421, and they are controlled by similar removable hand brake assemblies 423. Caster wheels 450 are removably mounted to frame 440, and the auxiliary wheels 462 may be selectively deployed as before when the large drive wheels 415 are removed. The alternative wheelchair construction 41 features a unique knock-down frame 440 which can be readily disassembled without tools and stored in a suitable carrying case or the like for storage on board aircraft. The pneumatic cylinders attach to the frame with the two quick release cams 414 (FIG. 16), which permit the cylinder "power pack" to be quickly and conveniently removed and changed. This facilitates use of the chair by persons of different body weights.

Figure 16:
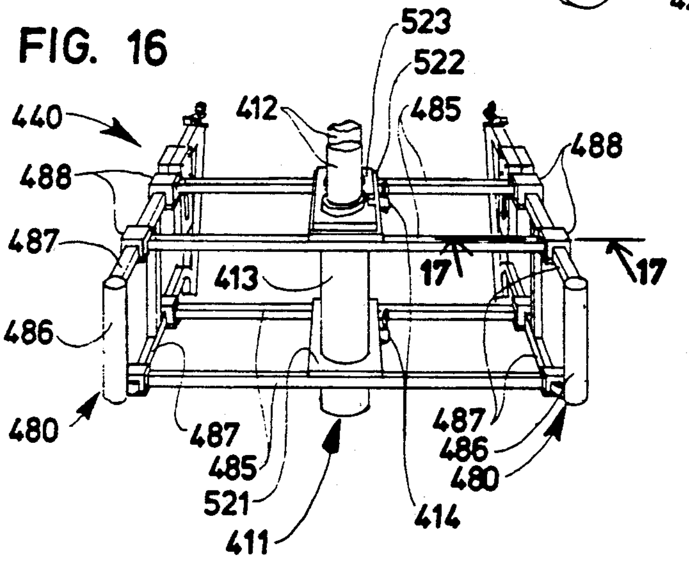
FIG. 16 is an enlarged, fragmentary, perspective view of the preferred frame of the wheelchair of FIG. 15, with portions thereof broken away, shown in section, and/or omitted for clarity.

With specific reference to FIG. 16, frame 440 comprises a pair of rigid spaced apart sides 480 retained in parallel, spaced-apart relation by a plurality of rigid cross braces 485. Sides 480 each comprise a pair of parallel end pieces 486 spaced apart by generally parallel top and bottom rails 487. Cross braces 485 preferably comprise equal lengths of square aluminum tubing which are removably secured to frame sides 480 by rigid couplers 488.

Figure 17:
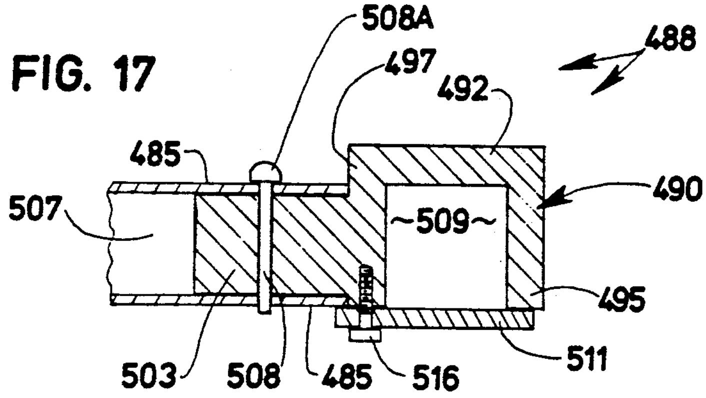
FIG. 17 is an enlarged, fragmentary sectional view of a preferred frame coupling for the wheelchair of FIGS. 15–16.
Figure 19:
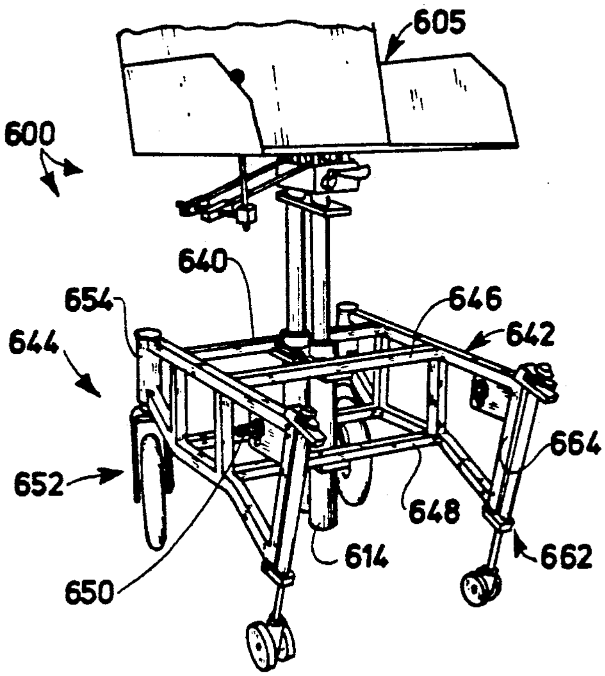
FIG. 19 is a fragmentary perspective view of a second alternative embodiment, with the large drive wheels removed for clarity.
Figure 20:
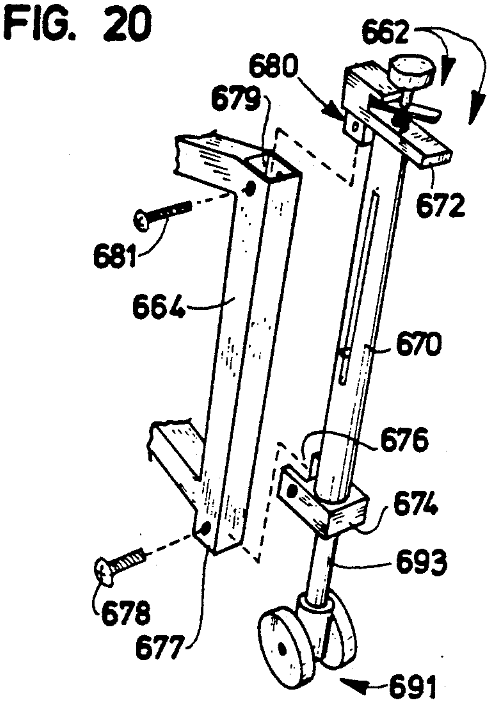
FIG. 20 is an enlarged fragmentary exploded view of an alternative "outboard" auxiliary wheel system.

As best viewed in FIG. 17, each of the couplers 488 comprises a generally box-like body 490 comprising a top 492 integral with an outer end wall 495 and an inner side wall 497. A rigid neck 503 extends integrally outwardly from inner wall 497 and is slidably received within the hollow interior 507 at each end of each cross brace 485. Preferably the outer periphery of neck 503 is frictionally fitted within interior 507 of cross brace 485 and may be additionally secured in position by a rigid roll pin 508 which penetrates cross brace 485 and neck 503. Roll pin 508 preferably comprises a head 508A which can be conveniently grasped by the user to facilitate its removal when appropriate.

Top 492 and walls 495, 497 of coupler 488 define an open channel 509 adapted to receive rails 487 of frame sides 80. The coupler 488 is preferably semi-permanently retained in position by a rigid bottom 511 which extends between walls 495, 497. Bottom 511 of coupler 488 is preferably pivotally coupled to body 490 by a shoulder bolt 516 or similar fastener which penetrates plate 511 and extends upwardly into coupler side wall 497. When it is desired to disassemble the frame 440 for storage, the user opens each of the couplers 488 by pivoting bottom 511 out of contact with end wall 495 and simply lifts the coupler off of the rail 487. If desired, the user may further break down the assembly by removing roll pin 508A and disengaging coupler 488 from cross brace 485.

As indicated, the latter-described alternative frame configuration 41 results in a plurality of rigid frame components which can be easily packed into a suitable carrying case and transported for convenient travel.

Figure 21:
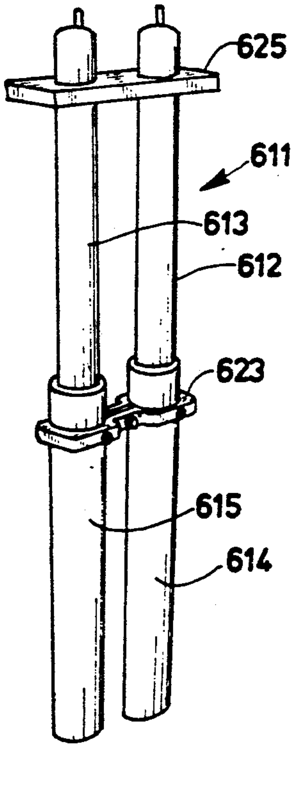
FIG. 21 is an enlarged perspective view of the removable power pack assembly, with the cylinders shown in the extended position; and, FIG. 22 is a perspective view of the preferred frame for the wheelchair of FIG. 19.
Figure 22:
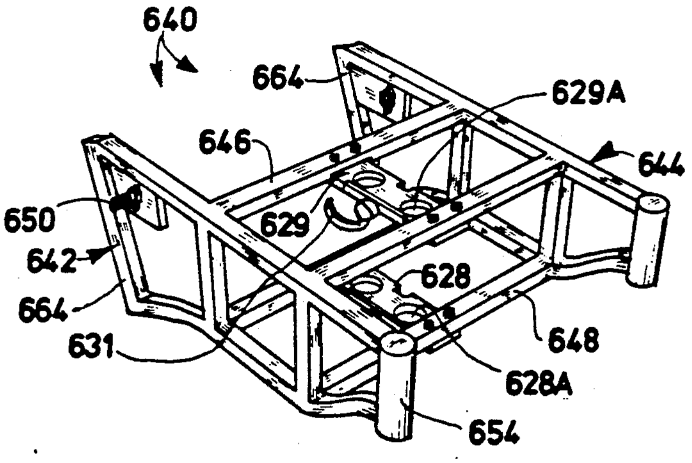

With reference now directed to FIGS. 19–22, a second alternative embodiment comprising a wheelchair 600 is illustrated. Wheelchair 600 comprises a rigid, box-like frame 640 (FIG. 22) whose opposite sides 642, 644 are permanently connected by a pair of transverse upper cross braces 646 and a pair of lower transverse cross braces 648. While not totally collapsible, frame 640 does assume a compact profile when the other components are removed. As seen in FIG. 22, frame 640 is "naked", in that virtually all of the components (which are similar to those previously described) have been removed.

Frame 640 supports a seat 605 similar to seat 35 which is mounted on the removable power pack assembly 611 (FIG. 21). The power pack assembly 611 comprises a pair of pneumatic cylinders 2, 613 coaxially disposed within sleeves 614, 615. The sleeves are secured together by plate 623, and the cylinders are reinforced by a synchronizing plate 625. The power pack 611 is removably disposed within frame 640, with the sleeves 614, 615 penetrating orifices 629A and 628A in plates 629 and 628 respectively. Sleeves 614, 615 function somewhat similarly to sleeve pairs 413, 62A, 62B already discussed. A cam lock assembly 631 locks the power pack when installed. As before they house the pneumatic cylinders and couple the seat to the frame. They include only one tubular member, since the sleeves need not be extensible as the frame does not fold.

The large drive wheels (not shown) are removably mounted on quick-release axles 650. Caster wheels 652 are removably mounted to frame sleeve ends 654. An outboard auxiliary wheel system 662 functions similarly to those discussed previously. It is externally mounted to frame end 664. The generally tubular body 670 extends from a lock body 672 and a lower brace 674. Brace 674 includes a hollow channel 676 which surrounds bottom 677 of frame and is fastened by screw 678. Nub 680 projecting downwardly from lock body 672 is received within passageway 679 of frame end 664, and is fastened by screw 681. Roller wheels 691 are controlled by telescoping shaft 693 coaxially received within body 670. The auxiliary wheel system 662 may thus be completely removed from frame 640. Internal components within housing 670 are similar to those discussed previously in FIG. 14, and the apparatus may be selectively deployed substantially as before.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A multiple mode wheelchair comprising:

seat means for receiving and supporting a user of said wheelchair;

frame means for suspending said seat means;

power pack means operatively associated with said frame means for extending and/or retracting said seat means relative to said frame means, said power pack means comprising extensible sleeve means coupled to said frame means, and cylinder means operatively associated with said sleeve means for raising or lowering said seat means, said cylinder means comprising a pair of pneumatic cylinders;

control means accessible from said seat means for activating said pneumatic cylinders;

means for synchronizing said pneumatic cylinders;

user removable drive wheel means for suspending and propelling said wheelchair over a supporting surface;

caster wheel means for supporting said frame means in cooperation with said drive wheel means; and, auxiliary wheel means for selectively supporting said wheelchair when said drive wheel means are removed, and means enabling the selective extension and/or retraction of said auxiliary wheel means relative to said frame means.

2. The wheelchair as defined in claim 1 including quick-release axle means for receiving and temporarily mounting said drive wheel means and means for releasably mounting said center wheel means.

3. The wheelchair as defined in claim 2 wherein said means enabling extension and retraction of said auxiliary wheel means from said frame means comprises:

roller wheel means adapted to be selectively disposed in contact with said surface;

elongated strut means disposed within said frame means and attached at one end to said roller wheel means;

elongated rod means disposed within said frame means and linked at one end to said strut means, wherein said rod means and said strut means are coaxially telescoped together;

said strut means comprises elongated follower slot means for controlling said rod means;

said rod means comprises tracking pin means received within said follower slot means; and, binder handle means for selectively locking said rod means, whereby to lock said roller wheels in a desired position.

4. The wheelchair as defined in claim 3 wherein at least a portion of said follower slot means are adapted to lock said pin means in a position wherein said rod means and said strut means are maximally extended.

5. The wheelchair as defined in claim 1 wherein said frame means is collapsible.

6. A multiple mode wheelchair comprising:

seat means for receiving and supporting a user of said wheelchair;

selectively collapsible frame means for suspending said seat means, said frame means comprising pair of rigid, spaced apart sides and a foldable linkage assembly for mechanically linking said sides together and enabling them to fold toward or away from one another, said linkage assembly comprising a pair of spaced apart parallelogram linkages and means for synchronizing said parallelogram linkages;

power pack means operatively associated with said frame means for extending and/or retracting said seat means relative to said frame means, said power pack means comprising extensible sleeve means coupled to said frame means, and cylinder means disposed within said sleeve means for raising or lower said seat means, said cylinder means comprising a pair of pneumatic cylinders;

control means accessible from said seat means for activating said pneumatic cylinders;

means for synchronizing said pneumatic cylinders;

user removable drive wheel means for suspending and propelling said frame means over a supporting surface;

caster wheel means for supporting said frame means in cooperation with said drive wheel means;

auxiliary wheel means adjustably secured to said frame means for selectively supporting said wheelchair when said drive wheel means are removed.

7. The wheelchair as defined in claim 6 wherein said synchronizing means comprises upper and lower support block means extending across said frame means between said parallelogram linkages.

8. The wheelchair as defined in claim 7 wherein said comprises a lower sleeve anchored to said lower support block means and an upper sleeve anchored to said upper support block means, said upper sleeve coaxially telescopically coupled to said lower sleeve.

9. The wheelchair as defined in claim 6 including means for enabling the selective extension and/or retraction of said auxiliary wheel means from said frame means, said means for enabling extension and retraction of said auxiliary wheel means from said frame means comprising:

roller wheel means adapted to be selectively disposed in contact with said surface;

elongated strut means disposed within said frame means and attached at one end to said roller wheel means;

elongated rod means disposed within said frame means and linked at one end to said strut means, wherein said rod means and said strut means are extensible relative to each other; and, binder handle means for selectively locking said rod means, whereby to lock said roller wheels in a desired position.

10. The wheelchair as defined in claim 9 wherein said rod means and said strut means are coaxially telescoped together, and:

said strut means comprises elongated follower slot means for controlling said rod means;

said rod means comprises tracking pin means received within said follower slot means; and, wherein at least a portion of said follower slot means are adapted to lock said pin means in a position where said rod means and said strut means are maximally extended.

11. The wheelchair as defined in claim 10 including clamp means interconnecting said seat means to said cylinder means, said clamp means comprising:

a pair of rigid brackets permanently mounted to the underside of said seat means;

a pair of floating jaws associated with each of said pair of brackets for receiving said cylinders; and, quick-release cam lock means for selectively opening and closing said floating jaws.

12. A multiple mode collapsible wheelchair comprising:

seat means for receiving and supporting a user of said wheelchair;

frame means for suspending said seat means;

sleeve means centrally disposed within said frame means for reversibly mounting said seat means;

pneumatic cylinder means associated with said sleeve means for vertically extending and/or retracting said seat means relative to said frame means, said cylinder means comprising a pair of pneumatic cylinders;

control means accessible from said seat means for activating said pneumatic cylinders;

means for synchronizing said pneumatic cylinders;

removable drive wheel means for suspending and propelling said frame means over a supporting surface;

caster wheel means for supporting said frame means in cooperation with said drive wheel means; and, auxiliary wheel means secured to said frame means for selectively supporting said wheelchair when said drive wheel means are removed.

13. The wheelchair as defined in claim 12 wherein said frame means is collapsible, and comprises:

a pair of rigid, spaced apart sides;

a foldable linkage assembly for mechanically linking said sides together, enabling them to fold toward or away from one another, said linkage assembly comprising a pair of spaced apart parallelogram linkages;

means for coupling said linkage assembly to said sleeve means; and means for synchronizing said parallelogram linkages.

14. The wheelchair as defined in claim 13 wherein said means for synchronizing said parallelogram linkages comprises upper and lower support block means extending across said frame means between said parallelogram linkages.

15. The wheelchair as defined in claim 14 wherein said sleeve means comprises a lower sleeve anchored to said lower support block means and an upper sleeve anchored to said upper support block means, said upper sleeve coaxially telescopingly coupled to said lower sleeve.

16. The wheelchair as defined in claim 15 including clamp means for attaching said seat means to said frame means, said clamp means comprising:

rigid bracket means permanently mounted to the underside of said seat means;

jaw means associated with said bracket means for receiving said cylinder means; and, cam lock means for selectively opening and closing said jaw means to secure said cylinder means.

17. The wheelchair as defined in claim 13 wherein said auxiliary wheel means is selectively removably coupled to said frame means, and comprises means for enabling the selective extension and/or retraction of said auxiliary wheel means relative to said frame means.

18. The wheelchair as defined in claim 17 wherein said means for enabling extension and retraction of said auxiliary wheel means from said frame means comprises:

roller wheel means adapted to be selectively disposed in contact with said surface;

elongated strut means disposed within said frame means and attached at one end to said roller wheel means;

elongated rod means disposed within said frame means and linked at one end to said strut means, wherein said rod means and said strut means are extensible relative to each other; and, binder handle means for selectively locking said rod means, whereby to lock said roller wheels in a desired position.

19. The wheelchair as defined in claim 18 wherein said rod means and said strut means are coaxially telescoped together, and:

said strut means comprises elongated follower slot means for controlling said rod means; and, said rod means comprises tracking pin means received within said follower slot means.

20. The wheelchair as defined in claim 19 wherein at least a portion of said follower slot means are adapted to lock said pin means in a position where said rod means and said strut means are maximally extended.

21. A multiple mode wheelchair comprising:

seat means for receiving and supporting a user of said wheelchair;

frame means for suspending said seat means, said frame means comprising a pair of opposing sides;

power pack means removably associated with said frame means for reversibly mounting said seat means to said frame means;

pneumatic cylinder means associated with said power pack means for vertically extending and/or retracting said seat means relative to said frame means, said cylinder means comprising a pair of pneumatic cylinders;

control means accessible from said seat means for activating said pneumatic cylinders;

means for synchronizing said pneumatic cylinders;

removable drive wheel means for suspending and propelling said frame means over a supporting surface;

caster wheel means of supporting said frame means in cooperation with said drive wheel means; and, extensible auxiliary wheel means secured to said frame means for selectively supporting said wheelchair when said drive wheel means are removed.

22. The wheelchair as defined in claim 21 including means for enabling the selective attachment or removal of said auxiliary wheel means from said frame means.

23. The wheelchair as defined in claim 21 wherein said auxiliary wheel means comprises:

roller wheel means adapted to be selectively disposed in contact with said surface;

elongated strut means disposed within said frame means and attached at one end to said roller wheel means;

elongated rod means disposed within said frame means and linked at one end to said strut means, wherein said rod means and said strut means are extensible relative to each other; and, binder handle means for selectively locking said rod means, whereby to lock said roller wheels in a desired position.

24. The wheelchair as defined in claim 23 wherein said rod means and said strut means are coaxially telescoped together, and:

said strut means comprises elongated follower slot means for controlling said rod means; and, said rod means comprises tracking pin means received within said follower slot means.

25. The wheelchair as defined in claim 24 wherein at least a portion of said follower slot means are adapted to lock said pin means in a position where said rod means and said strut means are maximally extended.

26. The wheelchair as defined in claim 21 wherein said frame means comprises frame cross pieces extending between said sides and support block means extending between said frame means cross pieces, and said power pack means is removably coupled to said support block means.

27. The wheelchair as defined in claim 26 wherein including clamp means for attaching said seat means to said power pack means, said clamp means comprising:

bracket means permanently mounted to the underside of said seat means;

jaw means associated with said bracket means for receiving said cylinder means; and, lock means for selectively opening and closing said jaw means to engage said power pack means.

28. A multiple mode wheelchair comprising:

seat means for receiving and supporting a user of said wheelchair;

frame means for suspending said seat means, said frame means comprising a pair of sides and connecting means extending between said sides;

sleeve means centrally disposed within said frame means for reversibly mounting said seat means;

support block means extending between said connecting means for mounting said sleeve means;

pneumatic cylinder means associated with said sleeve means for vertically extending and/or retracting said seat means relative to said frame means, said cylinder means comprising a pair of pneumatic cylinders;

control means accessible from said seat means for activating said pneumatic cylinders;

means for synchronizing said pneumatic cylinders;

removable drive wheel means for suspending and propelling said frame means over a supporting surface;

caster wheel means for supporting said frame means in cooperation with said drive wheel means; and, auxiliary wheel means secured to said frame means for selectively supporting said wheelchair when said drive wheel means are removed.

29. The wheelchair as defined in claim 28 wherein said auxiliary wheel means is selectively extensible from said frame means.

30. The wheelchair as defined in claim 29 wherein said auxiliary wheel means comprises:

roller wheel means adapted to be selectively disposed in contact with said surface;

elongated strut means disposed within said frame means and attached at one end to said roller wheel means;

elongated rod means disposed within said frame means and linked at one end to said strut means, wherein said rod means and said strut means are extensible relative to each other; and, binder handle means for selectively locking said rod means, whereby to lock said roller wheels in a desired position.

31. The wheelchair as defined in claim 30 wherein said rod means and said strut means are coaxially telescoped together, and:

said strut means comprises elongated follower slot means for controlling said rod means; and, said rod means comprises tracking pin means received within said follower slot means.

32. The wheelchair as defined in claim 31 wherein at least a portion of said follower slot means are adapted to lock said pin means in a position where said rod means and said strut means are maximally extended.

33. The wheelchair as defined in claim 28 wherein said connecting means comprises rigid cross pieces semi-permanently, removably coupling together said frame means sides.

34. The wheelchair as defined in claim 33 wherein said support block means comprises:

separate upper and lower support blocks extending across said connecting means; and, said sleeve means extending between said lower support block and said upper support block.

35. The wheelchair as defined in claim 34 including clamp means for attaching said seat means to said cylinder means, said clamp means comprising:

rigid bracket means permanently mounted to the underside of said seat means;

jaw means associated with said bracket means for receiving said cylinder means; and, cam lock means for selectively opening and closing said floating jaw means to engage said cylinder means.

36. The wheelchair as defined in claim 28 wherein said frame means is collapsible, and said connecting means comprises a foldable linkage assembly for mechanically linking said frame sides together, enabling them to fold toward or away from one another.

37. The wheelchair as defined in claim 36 wherein said linkage assembly comprises a pair of spaced apart parallelogram linkages.

38. The wheelchair as defined in claim 37 including means for synchronizing said parallelogram linkages.

39. A multiple mode wheelchair comprising:

seat means for receiving and supporting a user of said wheelchair;

rigid frame means for suspending said seat means, said frame means comprising a pair of rigid, opposing sides, sand means connecting said sides;

power pack means removably secured to said frame means for mounting said seat means, said power pack means comprising a pair of pneumatic cylinders for vertically extending and/or retracting said seat means relative to said frame means;

control means accessible from said seat means for activating said pneumatic cylinders;

means for synchronizing said pneumatic cylinders;

removable drive wheel means for suspending and propelling said wheelchair over a supporting surface;

removable caster wheel means for supporting said frame means in cooperation with said drive wheel means; and, extensible auxiliary wheel means secured to said frame means for selectively supporting said wheelchair when said drive wheel means are removed.

40. The wheelchair as defined in claim 39 wherein said auxiliary wheel means comprises:

roller wheel means adapted to be selectively disposed in contact with said surface;

elongated strut means disposed within said frame means and attached at one end to said roller wheel means;

elongated rod means disposed within said frame means and linked at one end to said strut means, wherein said rod means and said strut means are extensible relative to each other; and, binder handle means for selectively locking said rod means, whereby to lock said roller wheels in a desired position.

41. The wheelchair as defined in claim 40 wherein said rod means and said strut means are coaxially telescoped together, and:

said strut means comprises elongated follower slot means for controlling said rod means; and, said rod means comprises tracking pin means received within said follower slot means.

42. The wheelchair as defined in claim 41 wherein at least a portion of said follower slot means are adapted to lock said pin means in a position where said rod means and said strut means are maximally extended.

43. The wheelchair as defined in claim 39 wherein said frame means comprises upper and lower support block means extending between said frame connecting means; and said power pack means comprises sleeve means extending between said lower support block means and said upper support block means.

44. The wheelchair as defined in claim 39 wherein said connecting means comprises a foldable linkage assembly for mechanically linking said frame sides together, enabling them to folded toward or away from one another.

45. The wheelchair as defined in claim 44 wherein said linkage assembly comprises a pair of spaced apart parallelogram linkages.

46. The wheelchair as defined in claim 45 including means for synchronizing said parallelogram linkages.

47. A multiple mode wheelchair comprising:

seat means for receiving and supporting a user of said wheelchair;

selectively collapsible frame means for suspending said seat means, said frame means comprising a pair of rigid, spaced apart sides and a foldable linkage assembly for mechanically linking said sides together to enable them to fold toward or away from one another, said linkage assembly comprising a pair of spaced apart parallelogram linkages and including synchronizing means comprising upper and lower support block means extending across said frame means between said parallelogram linkages;

means for mounting said seat means to said frame means, said mounting means comprising means for vertically extending and/or retracting said seat means relative to said frame means, said last-mentioned means comprising extensible sleeve means pivotally associated with said linkage assembly, said sleeve means comprising a lower sleeve anchored to said lower support block means and an upper sleeve anchored to said upper support block means, said upper sleeve coaxially telescopingly coupled to said lower sleeve;

user removable drive wheel means for suspending and propelling said frame means over a supporting surface;

caster wheel means for supporting said frame means in cooperation with said drive wheel means;

auxiliary wheel means adjustably secured to said frame means for selectively supporting said wheelchair when said drive wheel means are removed.

48. A multiple mode wheelchair comprising:

seat means for receiving and supporting a user of said wheelchair;

selectively collapsible frame means for suspending said seat means, said collapsible frame means comprising a pair of rigid, spaced apart sides and a foldable linkage assembly for mechanically linking said sides together, enabling them to fold toward or away from one another;

means for mounting said seat means to said frame means, said mounting means comprising extensible sleeve means pivotally associated with said linkage assembly;

means for vertically extending and/or retracting said seat means relative to said frame means comprising pressurized pneumatic cylinder means coaxially disposed within said sleeve means, and control means for activating said cylinder means;

clamp means interconnecting said seat means to said cylinder means, said clamp means comprising:

a pair of rigid brackets permanently mounted to the underside of said seat means;

a pair of floating jaws associated with each of said pair of brackets for receiving said cylinders; and, quick-release cam lock means for selectively opening and closing said floating jaws;

user removable drive wheel means for suspending and propelling said frame means over a supporting surface; and, caster wheel means for supporting said frame means in cooperation with said drive wheel means.

49. The wheelchair as defined in claim 48 wherein said wheelchair comprises auxiliary wheel means adjustably secured to said frame means for selectively supporting said wheelchair when said drive wheel means are removed.

50. The wheelchair as defined in claim 49 wherein said seat means comprises a cushioned platform, a removable back, removable armrests, and a removable footrest.

51. A multiple mode collapsible wheelchair comprising:

seat means for receiving and supporting a user of said wheelchair;

collapsible frame means for suspending said seat means, said frame means comprising:

a pair of rigid, spaced apart sides;

a foldable linkage assembly for mechanically linking said sides together, enabling them to fold toward or away from one another, said linkage assembly comprising a pair of spaced apart parallelogram linkages; and, means for synchronizing said parallelogram linkages comprising upper and lower support block means extending across said frame means between said parallelogram linkages;

sleeve means centrally disposed within said frame means for reversibly mounting said seat means, said sleeve means comprising a lower sleeve anchored to said lower support block means and an upper sleeve anchored to said upper support block means, said upper sleeve coaxially telescopingly coupled to said lower sleeve;

means associated with said sleeve means for vertically extending and/or retracting said seat means relative to said frame means;

removable drive wheel means for suspending and propelling said frame means over a supporting surface;

caster wheel means for supporting said frame means in cooperation with said drive wheel means; and, auxiliary wheel means secured to said frame means for selectively supporting said wheelchair when said drive wheel means are removed.

52. The wheelchair as defined in claim 51 including clamp means for attaching said seat means to said frame means, said clamp means comprising:

rigid bracket means permanently mounted to the underside of said seat means;

jaw means associated with said bracket means for receiving said cylinder means; and, cam lock means for selectively opening and closing said jaw means to secure said cylinder means.

53. The wheelchair as defined in claim 51 including means for enabling the selective extension and/or retraction of said auxiliary wheel means from said frame means.

54. A multiple mode wheelchair comprising:

seat means for receiving and supporting a user of said wheelchair;

frame means for suspending said seat means, said frame means comprising a pair of opposing sides and frame cross pieces extending between said sides and support block means extending between said frame means cross pieces;

power pack means removably coupled to said support block means for reversibly mounting said seat means to said frame means, and for operatively vertically extending and/or retracting said seat means relative to said frame means;

clamp means for attaching said seat means to said power pack means, said clamp means comprising:

bracket means permanently mounted to the underside of said seat means;

jaw means associated with said bracket means for receiving said cylinder means; and, lock means for selectively opening and closing said jaw means to engage said power pack means;

removable drive wheel means for suspending and propelling said frame means over a supporting surface;

caster wheel means for supporting said frame means in cooperation with said drive wheel means; and, extensible auxiliary wheel means secured to said frame means for selectively supporting said wheelchair when said drive wheel means are removed.

55. A multiple mode wheelchair comprising:

seat means for receiving and supporting a user of said wheelchair;

rigid frame means for suspending said seat means, said frame means comprising a pair of rigid, opposing sides, means connecting said sides, and upper and lower support block means extending between said means connecting said sides;

power pack means removably secured to said frame means for mounting said seat means, said power pack means comprising sleeve means extending between said lower support block means and said upper support block means and cylinder means within said sleeve means for vertically extending and/or retracting said seat means relative to said frame means;

removable drive wheel means for suspending and propelling said wheelchair over a supporting surface;

removable caster wheel means for supporting said frame means in cooperation with said drive wheel means; and, extensible auxiliary wheel means secured to said frame means for selectively supporting said wheelchair when said drive wheel means are removed.

* * * * *